(12) United States Patent
Sawanobori et al.

(10) Patent No.: US 12,517,416 B2
(45) Date of Patent: Jan. 6, 2026

(54) BLADE OPEN-CLOSE DEVICE AND ELECTRONIC DEVICE

(71) Applicant: NIDEC PRECISION CORPORATION, Tokyo (JP)

(72) Inventors: Koji Sawanobori, Tokyo (JP); Ryosuke Ushio, Tokyo (JP); Kenzo Imai, Tokyo (JP)

(73) Assignee: NIDEC PRECISION CORPORATION, Tokyo (JP)

( * ) Notice: Subject to any disclaimer, the term of this patent is extended or adjusted under 35 U.S.C. 154(b) by 306 days.

(21) Appl. No.: 18/463,295

(22) Filed: Sep. 8, 2023

(65) Prior Publication Data

US 2024/0085761 A1    Mar. 14, 2024

(30) Foreign Application Priority Data

Sep. 14, 2022    (JP) .................................. 2022-145736

(51) Int. Cl.
 *G03B 11/04*    (2021.01)
(52) U.S. Cl.
 CPC .................................. *G03B 11/043* (2013.01)
(58) Field of Classification Search
 CPC .................................................. G03B 11/043
 See application file for complete search history.

(56) References Cited

U.S. PATENT DOCUMENTS

| | | | |
|---|---|---|---|
| 11,611,687 B2 | 3/2023 | Ushio et al. | |
| 2020/0249415 A1* | 8/2020 | Wang | G03B 11/043 |
| 2021/0149272 A1* | 5/2021 | Li | H04N 23/55 |
| 2022/0057692 A1 | 2/2022 | Ushio et al. | |
| 2022/0091478 A1 | 3/2022 | Sawanobori et al. | |
| 2022/0091479 A1 | 3/2022 | Sawanobori | |
| 2023/0026738 A1 | 1/2023 | Ushio et al. | |
| 2023/0027221 A1 | 1/2023 | Ushio et al. | |

FOREIGN PATENT DOCUMENTS

| | | |
|---|---|---|
| JP | 2007279605 A | 10/2007 |
| JP | 2022035773 A | 3/2022 |
| JP | 2022134235 A | 9/2022 |

* cited by examiner

*Primary Examiner* — James A Dudek
(74) *Attorney, Agent, or Firm* — HAUPTMAN HAM, LLP

(57) ABSTRACT

A blade open-close device includes a base, a blade, an actuator unit, a detectable member, and a detector. The base includes an opening portion on an optical axis. The blade is movable in an intersecting direction to cover or uncover the opening portion. The actuator unit moves the blade to one of a closing position to cover the opening portion or an opening position to uncover the opening portion. The detectable member changes a position of a first magnet and a position of a second magnet in response to coming into contact with the blade moving. The detector detects the first magnet when the blade is at the opening position and detects the second magnet when the blade is at the closing position.

8 Claims, 18 Drawing Sheets

BLADE OPEN-CLOSE DEVICE AND ELECTRONIC DEVICE

RELATED APPLICATIONS

The present application claims priority to Japanese Application Number 2022-145736, filed Sep. 14, 2022, the disclosure of which is hereby incorporated by reference herein in its entirety.

BACKGROUND

Technical Field

The present invention relates to a blade open-close device and an electronic device.

Description of the Background

A device for opening and closing a blade described in Patent Literature 1 includes a rotor magnet that rotates when an actuator coil is energized with a current. In this structure, an engagement portion in a lever is engaged with a cam groove on the blade to move the blade between an opening position and a closing position.

CITATION LIST

Patent Literature

Patent Literature 1: Japanese Unexamined Patent Application Publication No. 2022-035773

BRIEF SUMMARY

As described in Patent Literature 1, the blade open-close device including a drive for driving the blade may detect the position of the blade by detecting a detectable member on the blade. However, the blade using this method is heavier than the blade alone and thus is drivable with the drive using greater torque.

One or more aspects of the present invention are directed to a blade open-close device and an electronic device that can avoid increasing torque used by the drive in detecting the position of the blade.

A blade open-close device according to an embodiment includes a body, a blade, a drive, a detectable member, and a detector. The body includes an opening portion on an optical axis of an optical member. The blade is movable in an intersecting direction intersecting with an optical axis direction of the optical member to cover or uncover the opening portion. The drive moves the blade to one of a closing position to cover the opening portion or an opening position to uncover the opening portion. The detectable member includes a first detectable portion and a second detectable portion. The detectable member changes a position of the first detectable portion and a position of the second detectable portion in response to coming into contact with the blade moving. The detector detects the first detectable portion when the blade is at the opening position and detects the second detectable portion when the blade is at the closing position.

An electronic device according to an embodiment includes the blade open-close device described above.

The technique according to the above embodiments of the present invention can avoid increasing torque used by the drive in detecting the position of the blade.

DETAILED DESCRIPTION

First Embodiment

Figure 1:
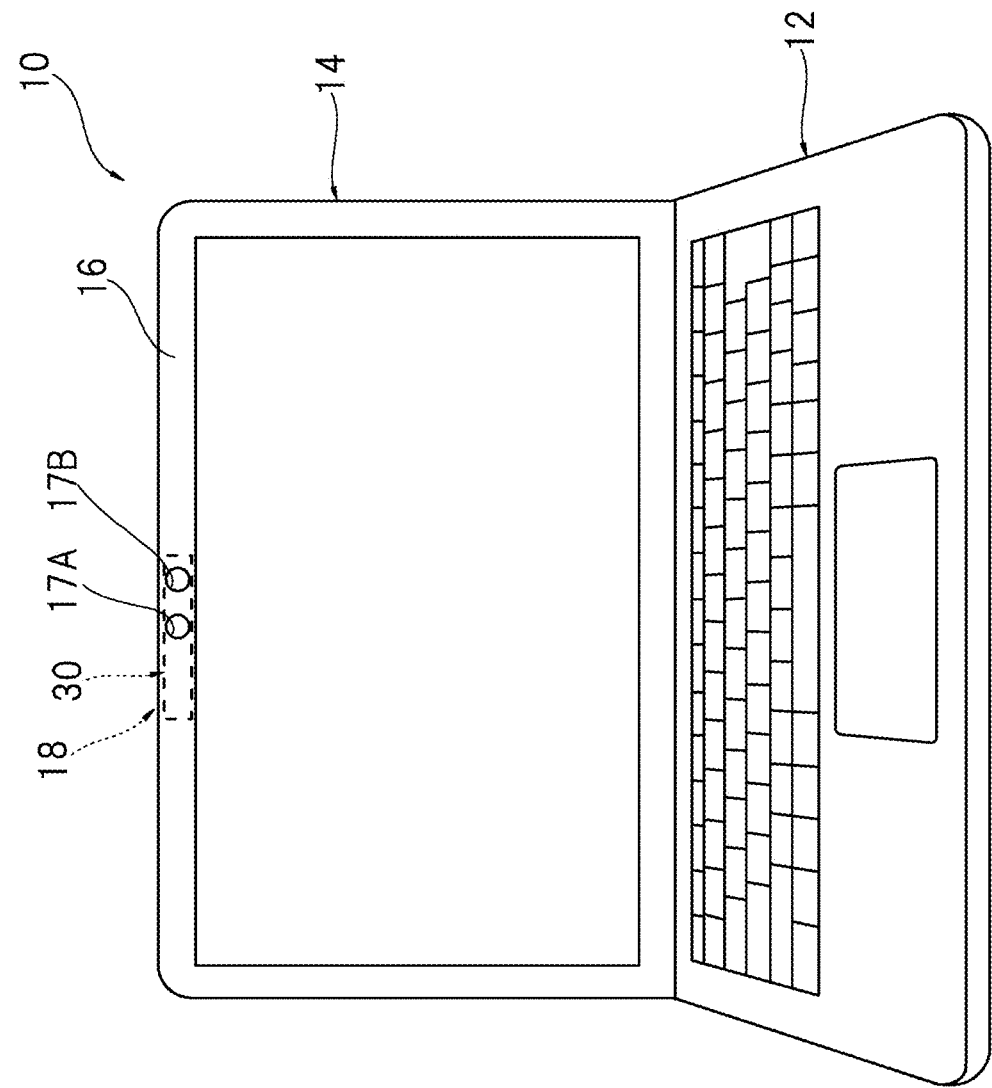
FIG. 1 is a diagram of a laptop personal computer incorporating a blade open-close device according to a first embodiment, showing its overall structure.

An electronic device and a blade open-close device according to a first embodiment of the present invention will now be described in detail with reference to FIGS. 1 to 12. In FIGS. 1 to 12, like reference numerals denote the same or like components. Such components will not be described repeatedly. In FIGS. 1 to 12, the scale and dimensions of each component may be exaggerated, or one or more components may not be shown. Unless otherwise specified, the terms such as first and second will be used herein simply to distinguish the components and will not represent a specific order or sequence.

Laptop Personal Computer

FIG. 1 shows a laptop personal computer 10 as an example electronic device. The laptop personal computer 10 includes an input 12 for input operations and a display 14 for displaying information. The display 14 includes a frame 16.

The frame 16 includes two holes, or a hole 17A and a hole 17B. The frame 16 incorporates a camera unit 18 and a blade open-close device 30 (described later). In other words, the laptop personal computer 10 includes the blade open-close device 30. The blade open-close device 30 is attached to the camera unit 18 and incorporated in the laptop personal computer 10. The laptop personal computer 10 thus has the camera function.

Figure 2:
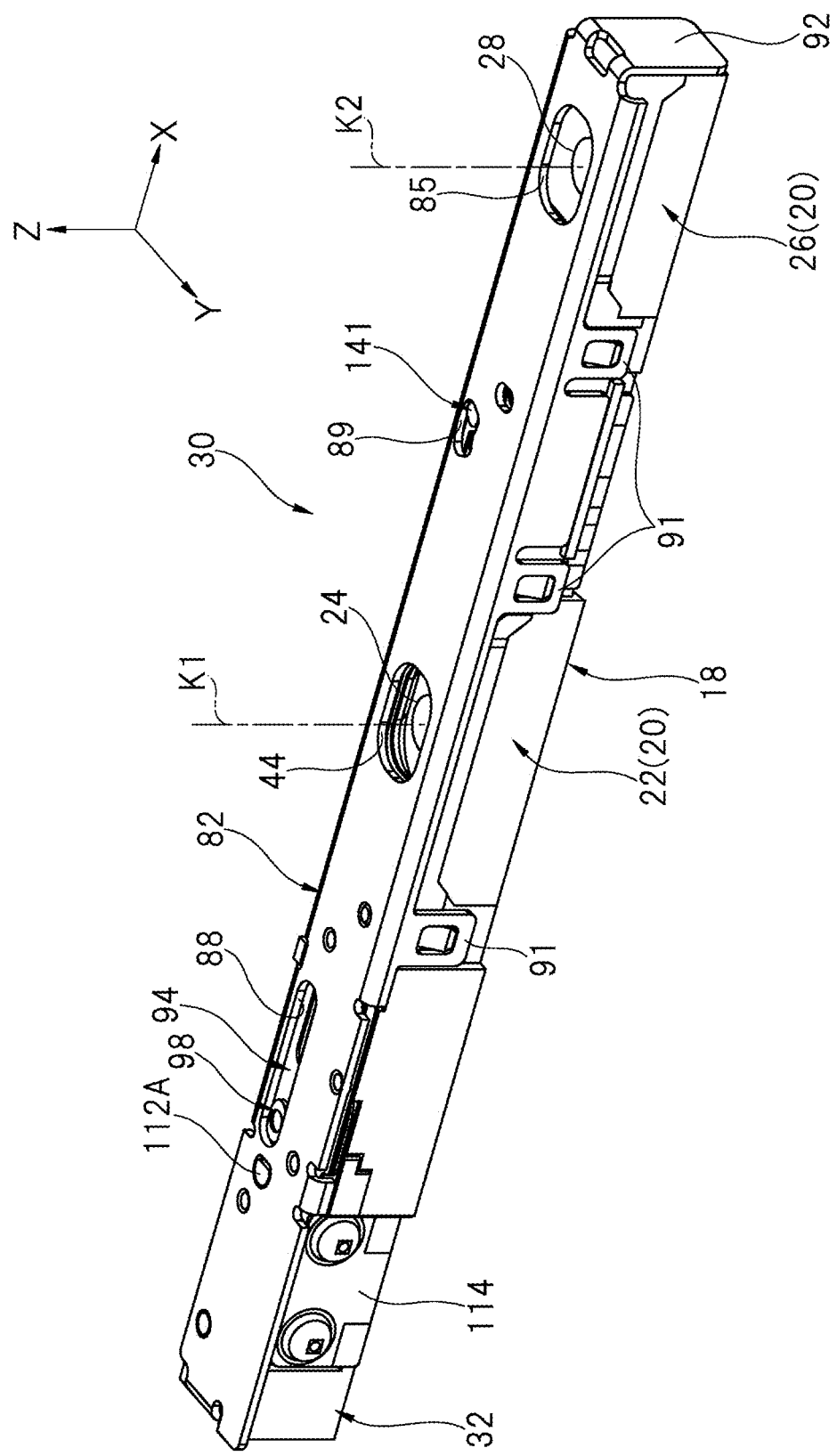
FIG. 2 is a perspective view of the blade open-close device according to the first embodiment.

As shown in FIG. 2, the camera unit 18 includes an optical member 20. The optical member 20 includes a lens unit 22 and a lens unit 26. The lens unit 22 is attached to the frame 16 (FIG. 1) to align with the hole 17A (FIG. 1). The lens unit 22 includes a lens 24. The lens 24 has an optical axis K1. The optical axis K1 extends in an optical axis direction indicated by arrow Z. The lens unit 26 is attached to the frame 16 to align with the hole 17B (FIG. 1). The lens unit 26 includes a lens 28. The lens 28 has an optical axis K2. The optical axis K2 extends in Z-direction, which is the optical axis direction. External light enters the lens 24 and the lens 28 in the direction from the arrowhead to the base of arrow Z. The blade open-close device 30 (described later) is a rectangular prism elongated in one direction. The blade open-close device 30 is mounted on a module board (not shown) on which the lens unit 22 and the lens unit 26 are located.

The blade open-close device 30 extends, as indicated by arrow X, in a direction orthogonal to arrow Z. X-direction is an example intersecting direction intersecting with Z-direction that serves as the optical axis direction. X-direction corresponds to the longitudinal direction of the blade open-close device 30 as viewed in the optical axis direction. A direction orthogonal to arrow Z and arrow X is indicated by arrow Y. Y-direction corresponds to the lateral direction of the blade open-close device 30 as viewed in the optical axis direction. For ease of explanation in the present embodiment, the terms up and upward refer to the positive Z-direction, and the terms down and downward to the negative Z-direction in FIG. 2. The terms right and rightward refer to the positive X-direction, and the terms left and leftward to the negative X-direction. The terms front and frontward refer to the positive Y-direction, and the terms rear and rearward to the negative Y-direction.

Blade Open-Close Device

Figure 3:
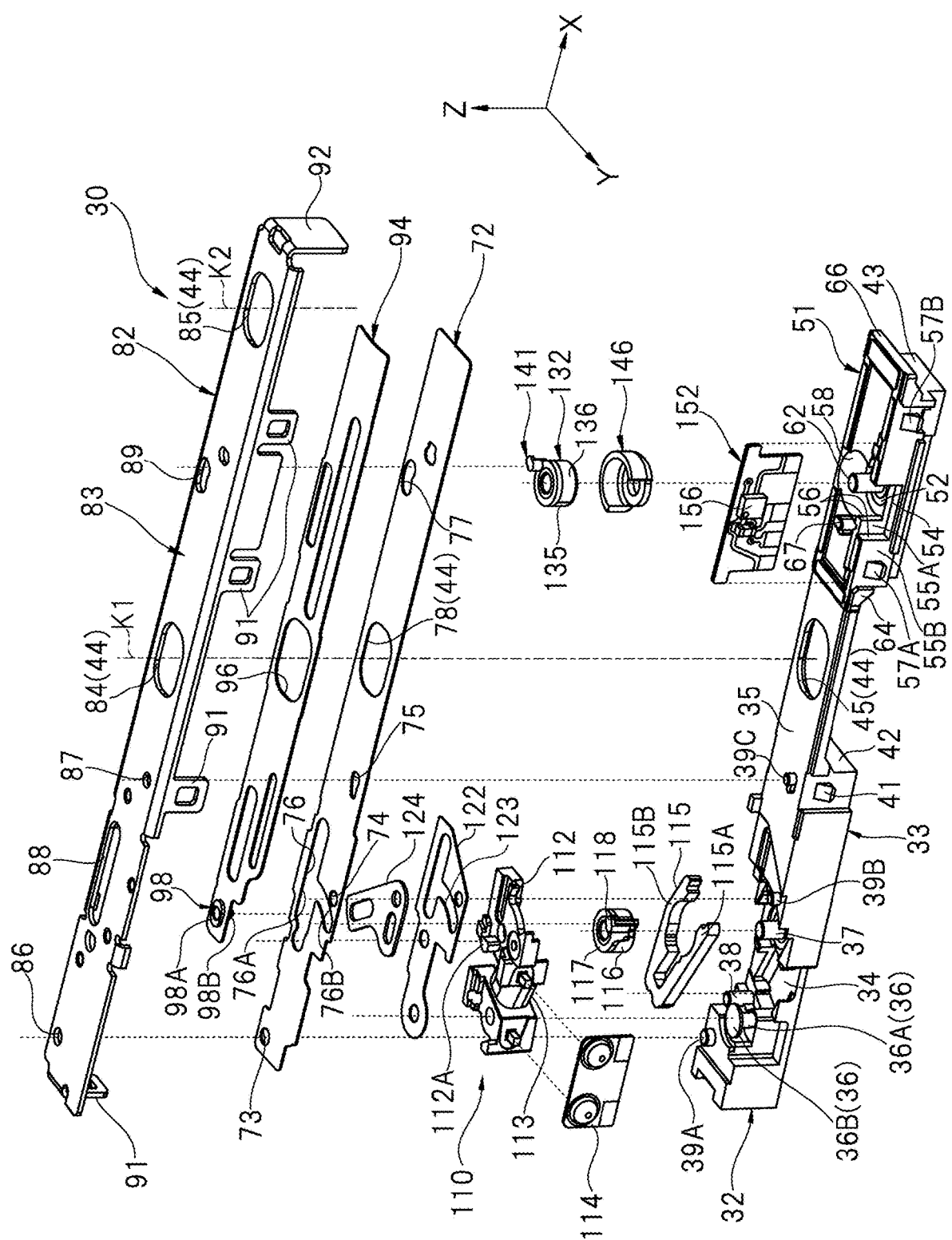
FIG. 3 is an exploded perspective view of the blade open-close device according to the first embodiment.

As shown in FIG. 3, the blade open-close device 30 includes a base 32, a blade 94, an actuator unit 110, a detectable member 132, a yoke member 146, and a detector 152. The blade open-close device 30 further includes a partition 72 and a cover 82.

Base

The base 32 is an example body. The base 32 is attached to the module board (not shown). The base 32 includes a first housing 33 and a second housing 51. The first housing 33 and the second housing 51 may be integral with or separate from each other. The first housing 33 accommodates the actuator unit 110. The second housing 51 accommodates the detectable member 132, the yoke member 146, and the detector 152.

The first housing 33 includes a first compartment 34 and a plate 35. The first compartment 34 is open upward. The first compartment 34 accommodates the actuator unit 110. The first compartment 34 includes a support shaft 36, a support shaft 37, a cylinder 38, a boss 39A, a boss 39B, and a boss 39C. The support shaft 36, the support shaft 37, and the cylinder 38 each extend upright in the optical axis direction from a lower portion of the first compartment 34. The support shaft 36 includes a cylinder 36A and a stopper 36B extending radially outward from the upper end of the cylinder 36A. The cylinder 36A and the stopper 36B shown in FIG. 3 are integral with each other. However, the stopper 36B is attached to the cylinder 36A after the first compartment 34 accommodates the actuator unit 110 (described later). The bosses 39A, 39B, and 39C protrude upward from upper end portions of the first compartment 34. The first housing 33 includes a protrusion 41 protruding frontward. The first housing 33 includes the same protrusions as the protrusion 41 on its rear and left side surfaces (not shown).

The plate 35 extends rightward from the upper right end of the first compartment 34. The plate 35 has a predetermined thickness in the optical axis direction. The plate 35 has a rectangular profile longer in the intersecting direction than in the front-rear direction as viewed in the optical axis direction. A first space 42 is located below the plate 35. The first space 42 accommodates the lens unit 22 (FIG. 2). The plate 35 has an opening 45 extending through the plate 35 in the optical axis direction. The opening 45 as well as openings 78, 84, and 85 (described later) are collectively referred to as an opening portion 44. Thus, the base 32 as well as the partition 72 and the cover 82 (described later) each include a part of the opening portion 44. The opening portion 44 aligns with the lens unit 22 and the lens unit 26 (FIG. 2). In other words, the opening portion 44 includes the openings 45, 78, 84, and 85 as appropriate for the lens unit 22 or the lens unit 26. The opening portion 44 is located on the optical axis K1 or the optical axis K2 as viewed in the optical axis direction. This causes light entering the opening portion 44 to reach the lens 24 or the lens 28 (FIG. 2).

The second housing 51 includes a second compartment 52, a connector 64, a flange 66, and a guide pin 67. The second compartment 52 is open upward. The second compartment 52 accommodates the detectable member 132, the yoke member 146, and the detector 152. More specifically, the second compartment 52 includes, for example, a mount 54, a recess 58, and a support shaft 62.

The mount 54 includes a vertical wall 55A and a vertical wall 55B spaced from each other in the front-rear direction. The vertical wall 55B is in front of the vertical wall 55A. The vertical wall 55A and the vertical wall 55B each extend upright in the optical axis direction from the bottom of the second compartment 52. In other words, the mount 54 is a slit extending in the intersecting direction as viewed in the optical axis direction. The detector 152 (described later) is placed between the vertical wall 55A and the vertical wall 55B and attached to the mount 54. The vertical wall 55A and the vertical wall 55B each have a cutout 56 being square as viewed from the front.

The recess 58 is a cylindrical bottomed space defined in a rectangular prism. The recess 58 is connected to the mount 54 through the cutouts 56. The support shaft 62 extends upright from the bottom of the recess 58. The support shaft 62 is a cylinder. The connector 64 protrudes leftward from the upper left end of the second compartment 52. The connector 64 connects the right end of the plate 35 to the second compartment 52. In other words, the first housing 33 and the second housing 51 are integral with each other. The base 32 may be the first housing 33 and the second housing 51 bonded together or formed integrally.

The flange 66 protrudes rightward from the upper right end of the second compartment 52. A second space 43 is located below the flange 66 and a right end portion of the cover 82 (described later). In other words, the second space 43 is surrounded by the second housing 51 and the cover 82. The second space 43 accommodates the lens unit 26 (FIG. 2). The second housing 51 includes, on its front surface, a protrusion 57A and a protrusion 57B protruding frontward. The second housing 51 includes the same protrusions as the protrusion 57A and the protrusion 57B on its rear surface (not shown). The guide pin 67 protrudes upward from a part of an upper surface of the second compartment 52.

Partition

The partition 72 is located on the base 32. The partition 72 is included in the example body. The partition 72 has a predetermined thickness in the optical axis direction and extends in the intersecting direction. The partition 72 has a length in the intersecting direction substantially equal to the length between the left end of the first housing 33 and the right end of the second housing 51. The partition 72 has attachment holes 73, 74, and 75, guide holes 76 and 77, and the opening 78. The attachment hole 73 receives the boss 39A. The attachment hole 74 receives the boss 39B. The attachment hole 75 receives the boss 39C.

The guide hole 76 includes, as viewed in the optical axis direction, a linear first hole 76A elongated in the intersecting direction and an arc-shaped second hole 76B branched from the first hole 76A. The first hole 76A guides an insertion portion 98B (described later) in the intersecting direction. The second hole 76B guides a connector 118 (described later). The guide hole 77 is arc-shaped as viewed in the optical axis direction. The guide hole 77 guides a hook 141 (described later). The opening 78 is between the guide hole 76 and the guide hole 77 in the intersecting direction. The opening 78 extends through the partition 72 in the optical axis direction. The opening 78 functions as an aperture that determines the amount of light entering the lens 24 (FIG. 2). Thus, the partition 72 may be referred to as an aperture blade.

Cover

The cover 82 covers the components of the blade open-close device 30 from above. The cover 82 is included in the example body. The cover 82 includes an upper plate 83 being an upper end portion of the blade open-close device 30. The upper plate 83 has a predetermined thickness in the optical axis direction and extends in the intersecting direction. The upper plate 83 has a rectangular profile longer in the intersecting direction than in the front-rear direction as viewed in the optical axis direction. The upper plate 83 has a length in the intersecting direction greater than the length between the left end of the first housing 33 and the right end of the second housing 51. The second space 43 is located below the right end of the upper plate 83.

The upper plate 83 has the opening 84 and the opening 85 both extending through the upper plate 83 in the optical axis direction. The opening 84 has its center located on the optical axis K1 as viewed in the optical axis direction. The opening 85 has its center located on the optical axis K2. The upper plate 83 also has attachment holes 86 and 87 and guide holes 88 and 89. The attachment hole 86 receives the boss 39A. The attachment hole 87 receives the boss 39C. The guide hole 88 is elongated linearly in the intersecting direction as viewed in the optical axis direction. The guide hole 88 guides a head 98A (described later) in the intersecting direction. The guide hole 89 is arc-shaped as viewed in the optical axis direction. The guide hole 89 guides the hook 141 (described later).

The upper plate 83 includes multiple engagement portions 91 extending downward from its front end, rear end, and left end. The engagement portions 91 at the rear end are not shown. Each engagement portion 91 is a square frame as viewed in the front-rear direction or in the left-right direction. The engagement portions 91 are engaged with the protrusions 41, the protrusions 57A, and the protrusions 57B to attach the cover 82 to the base 32. A side plate 92 extends downward from the right end of the upper plate 83. The side plate 92 is a right wall of the second space 43. The side plate 92 functions as a stopper that restricts rightward movement of the blade 94.

Blade

Figure 4:
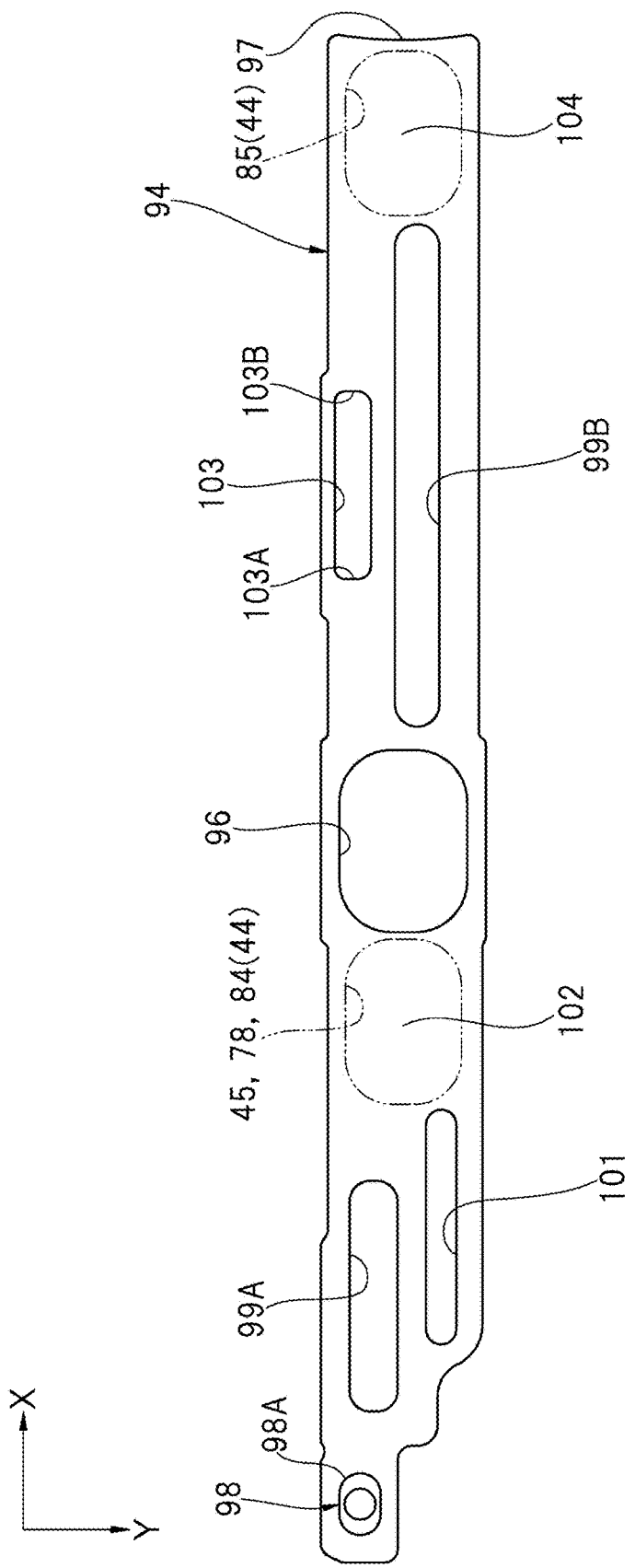
FIG. 4 is a plan view of a blade in the first embodiment.

As shown in FIGS. 3 and 4, the blade 94 is a plate having a predetermined thickness in the optical axis direction. The blade 94 is a rectangle longer in the intersecting direction than in the front-rear direction as viewed in the optical axis direction. The blade 94 has, at its center in the intersecting direction, an opening 96 extending through the blade 94 in the optical axis direction. The blade 94 covers or uncovers the opening 45, the opening 78, the opening 84, and the opening 85.

The blade 94 covers the opening portion 44 at a closing position. The blade 94 uncovers the opening portion 44 at an opening position. The blade 94 is movable in the intersecting direction between the closing position and the opening position. When the blade 94 is at the opening position, the opening 96 has its center located on the optical axis K1. The blade 94 has, at its right end, an arc 97 that is an arc cut. The arc 97 is recessed leftward. When the blade 94 is at the opening position, the arc 97 is located leftward from the left edge of the opening 85 in the intersecting direction.

The blade 94 has a through-hole (not shown) at its left end. The through-hole receives an engagement member 98. The engagement member 98 includes the head 98A located above the blade 94, and an insertion portion 98B (FIG. 3) extending downward from the head 98A through the through-hole and engageable with a second engagement hole 124C (described later). The blade 94 includes, on the right of the engagement member 98, an elongated hole 99A elongated in the intersecting direction. The blade 94 includes, on the right of the opening 96, a guide hole 99B elongated in the intersecting direction. The guide hole 99B receives the guide pin 67 (FIG. 3).

The blade 94 has a guide hole 101 in front of the elongated hole 99A. The guide hole 101 extends through the blade 94 in the optical axis direction and is elongated in the intersecting direction. The guide hole 101 receives the boss 39C (FIG. 3). When an edge of the guide hole 101 comes into contact with the boss 39C and an edge of the guide hole 99B comes into contact with the guide pin 67, the blade 94 is guided in the intersecting direction. In other words, the blade 94 is movable in the intersecting direction in the base 32 (FIG. 3).

In the blade 94, an elongated hole 103 is located behind the guide hole 99B. In other words, the blade 94 has the elongated hole 103. The elongated hole 103 is an example groove and extends through the blade 94 in the optical axis direction. The elongated hole 103 is elongated in the intersecting direction as viewed in the optical axis direction. In the present embodiment, a groove is not limited to a recess with a bottom, but may be a slit extending through a component, such as the elongated hole 103. The elongated hole 103 receives a columnar portion 142 (FIG. 7) described later. The elongated hole 103 has a first edge 103A as its left edge and a second edge 103B as its right edge. The first edge 103A and the second edge 103B can be in contact with the columnar portion 142 when the blade 94 moves in the intersecting direction.

The blade 94 has a first light shield 102 that is a portion leftward from the opening 96 and rightward from the elongated hole 99A and the guide hole 101. The first light shield 102 has no through-hole and blocks light. The first light shield 102 blocks light traveling through the opening 84 toward the blade 94 when the blade 94 is at the closing position. This prevents light from entering the opening 45 and the opening 78, and thus prevents light from entering the lens unit 22 (FIG. 2).

The blade 94 has a second light shield 104 that is a portion rightward from the guide hole 99B and the elongated hole 103 and leftward from the arc 97. The second light shield 104 has no through-hole and blocks light. The second light shield 104 blocks light traveling through the opening 85 toward the lens unit 26 (FIG. 2) when the blade 94 is at the closing position. This prevents light from entering the lens unit 26 (FIG. 2).

When the blade 94 is at the opening position, the openings 45, 78, 96, and 84 align with one another in the optical axis direction, allowing light to enter the lens unit 22. The opening 85 is also uncovered, allowing light to enter the lens unit 26. As described above, the blade 94 moves in the intersecting direction to cover or uncover the openings 45, 78, 84, 85, and 96.

Actuator Unit

As shown in FIG. 3, the actuator unit 110 is an example drive for driving the blade 94. The actuator unit 110 moves the blade 94 to either the closing position or the opening position. More specifically, the actuator unit 110 includes an attachment base 112, a coil 113, a terminal plate 114, a yoke 115, a rotor magnet 116, a lever 117, the connector 118, a partition member 122, and a cam plate 124.

The attachment base 112 is attached to the first compartment 34. The attachment base 112 includes a projection 112A. The projection 112A protrudes upward from the attachment base 112. The projection 112A functions as a stopper that restricts leftward movement of the blade 94. The coil 113 is wound around a part of the attachment base 112 and a part of the yoke 115 (described later).

The terminal plate 114 is attached to the attachment base 112 and electrically connected to a power supply (not shown). The terminal plate 114 is electrically connected to the coil 113. This allows the coil 113 to be energized with a current. A part of the coil 113 is connected to the yoke 115. The yoke 115 is formed from a magnetic material and includes an arm 115A and an arm 115B. The arm 115A and the arm 115B are magnetized to have different polarities from each other when the coil 113 is energized.

The rotor magnet 116 is between the arm 115A and the arm 115B. The rotor magnet 116 includes magnets that alternate their polarities in the circumferential direction. When the arm 115A and the arm 115B are magnetized to have polarities different from each other, a repulsive force or an attractive force acts on each magnet in the rotor magnet 116. This causes the rotor magnet 116 to rotate. The rotor magnet 116 rotates in a different direction when a current supplied to the coil 113 flows in a different direction. The lever 117 is attached to the upper end of the rotor magnet 116. The lever 117 extends radially outward from the rotor magnet 116. The lever 117 receives the connector 118 that is hook-shaped.

The partition member 122 is attached to the upper end of the attachment base 112. The partition member 122 separates a space in which the attachment base 112 is located from a space in which the cam plate 124 is located. The partition member 122 has a guide hole 123. The guide hole 123 receives the connector 118. This allows the connector 118 to be guided along the guide hole 123.

Figure 5:
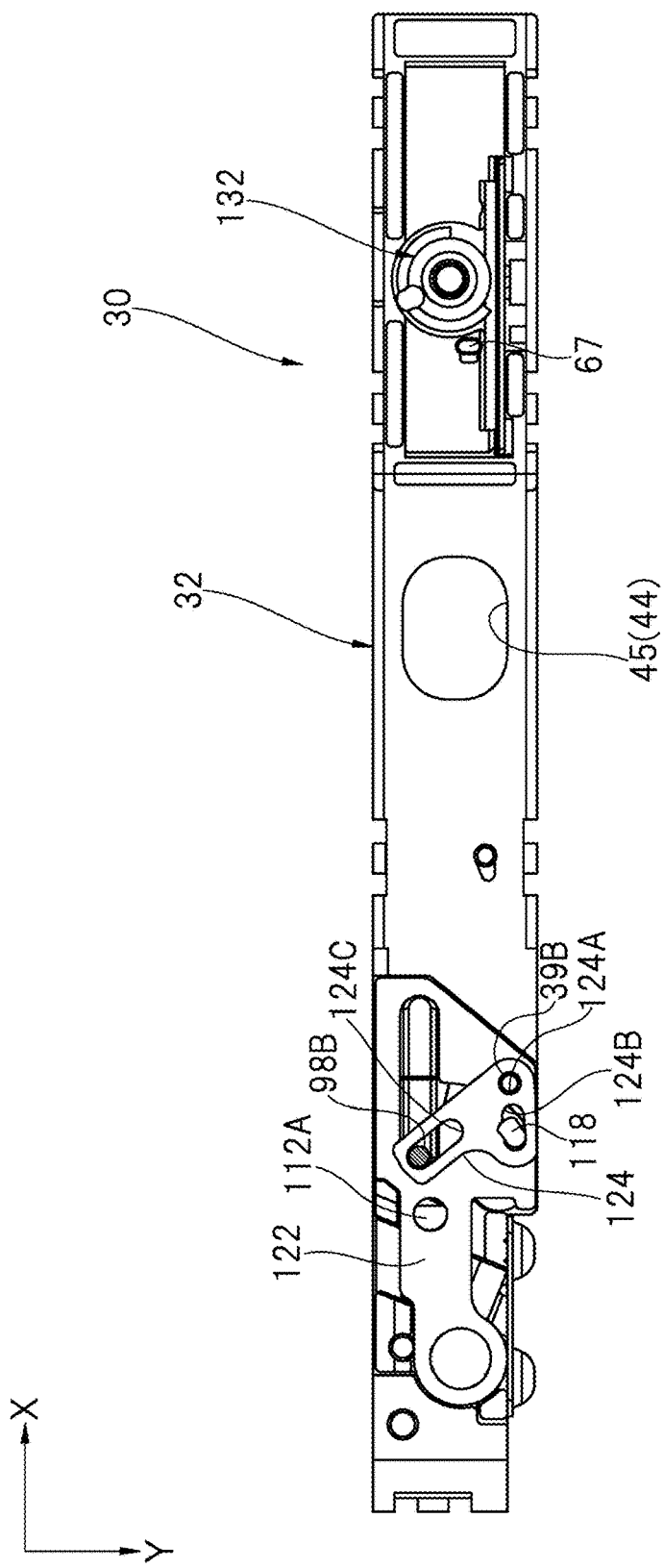
FIG. 5 is a plan view of the blade open-close device according to the first embodiment with a cover and the blade removed.

As shown in FIG. 5, the cam plate 124 is located above the partition member 122. The cam plate 124 has a shaft hole 124A, a first engagement hole 124B, and the second engagement hole 124C. The shaft hole 124A receives the boss 39B. This allows the cam plate 124 to rotate about the boss 39B. The first engagement hole 124B receives the connector 118. The second engagement hole 124C receives the insertion portion 98B.

When the blade 94 (FIG. 4) is at the opening position, the rotor magnet 116 (FIG. 3) and the connector 118 may start rotating counterclockwise in the figure. The connector 118 is then engaged with an edge of the first engagement hole 124B, causing the cam plate 124 to start rotating clockwise in the figure. The insertion portion 98B is then engaged with an edge of the second engagement hole 124C and moves rightward, causing the blade 94 to move rightward in the intersecting direction.

When the blade 94 is at the closing position, the rotor magnet 116 and the connector 118 may start rotating clockwise in the figure. The connector 118 is then engaged with an edge of the first engagement hole 124B, causing the cam plate 124 to start rotating counterclockwise in the figure. The insertion portion 98B is then engaged with an edge of the second engagement hole 124C and moves leftward, causing the blade 94 to move leftward in the intersecting direction.

Figure 6:
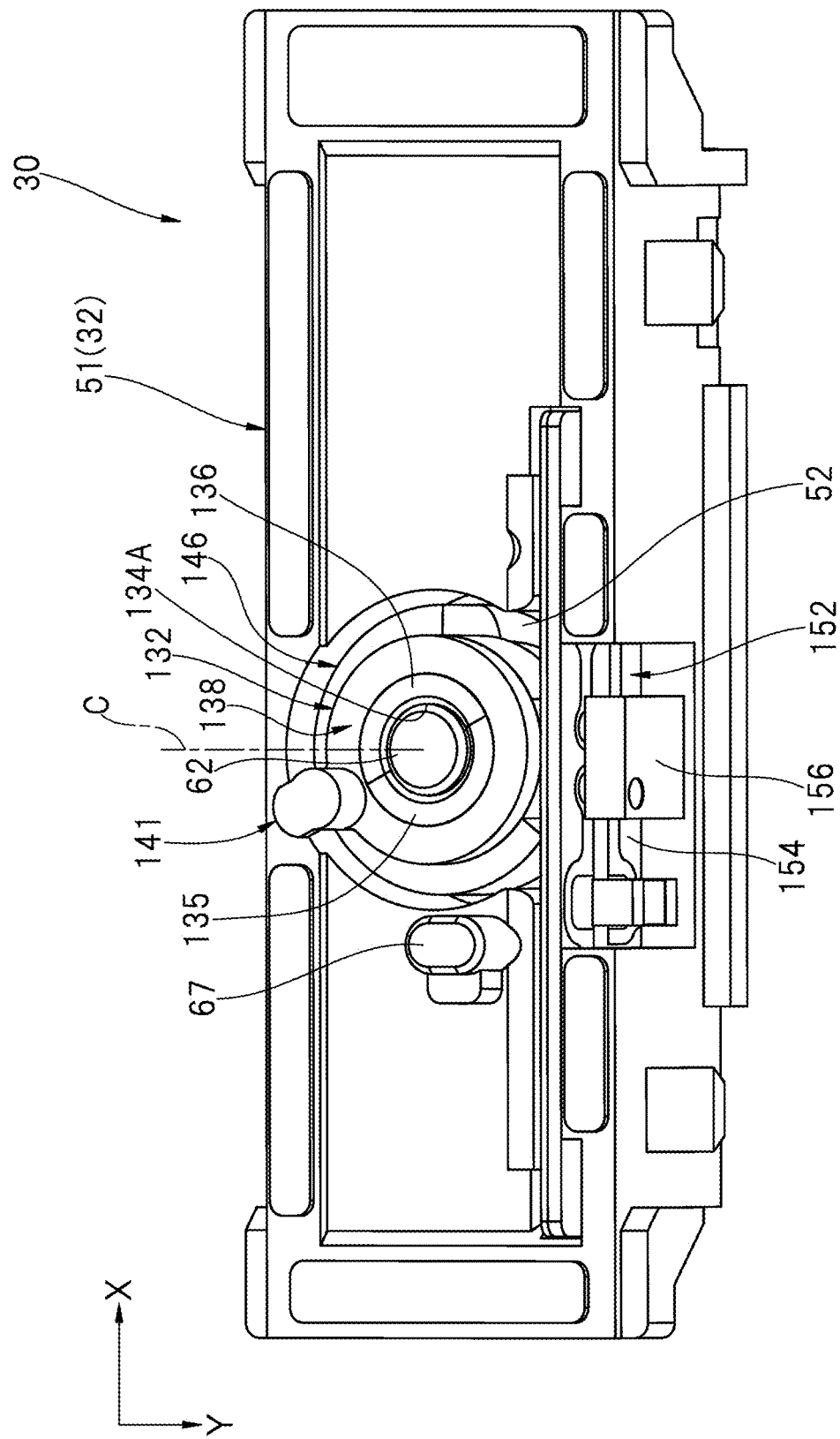
FIG. 6 is a perspective view of a second housing in the first embodiment, showing its components.

As shown in FIG. 6, the second compartment 52 accommodates the detectable member 132, the yoke member 146, and the detector 152. The detectable member 132 and the yoke member 146 are integral with each other. The detectable member 132 and the yoke member 146 are rotatable about the support shaft 62 (central axis C) in the base 32. The detector 152 is fixed to the second housing 51.

Detectable Member

Figure 7:
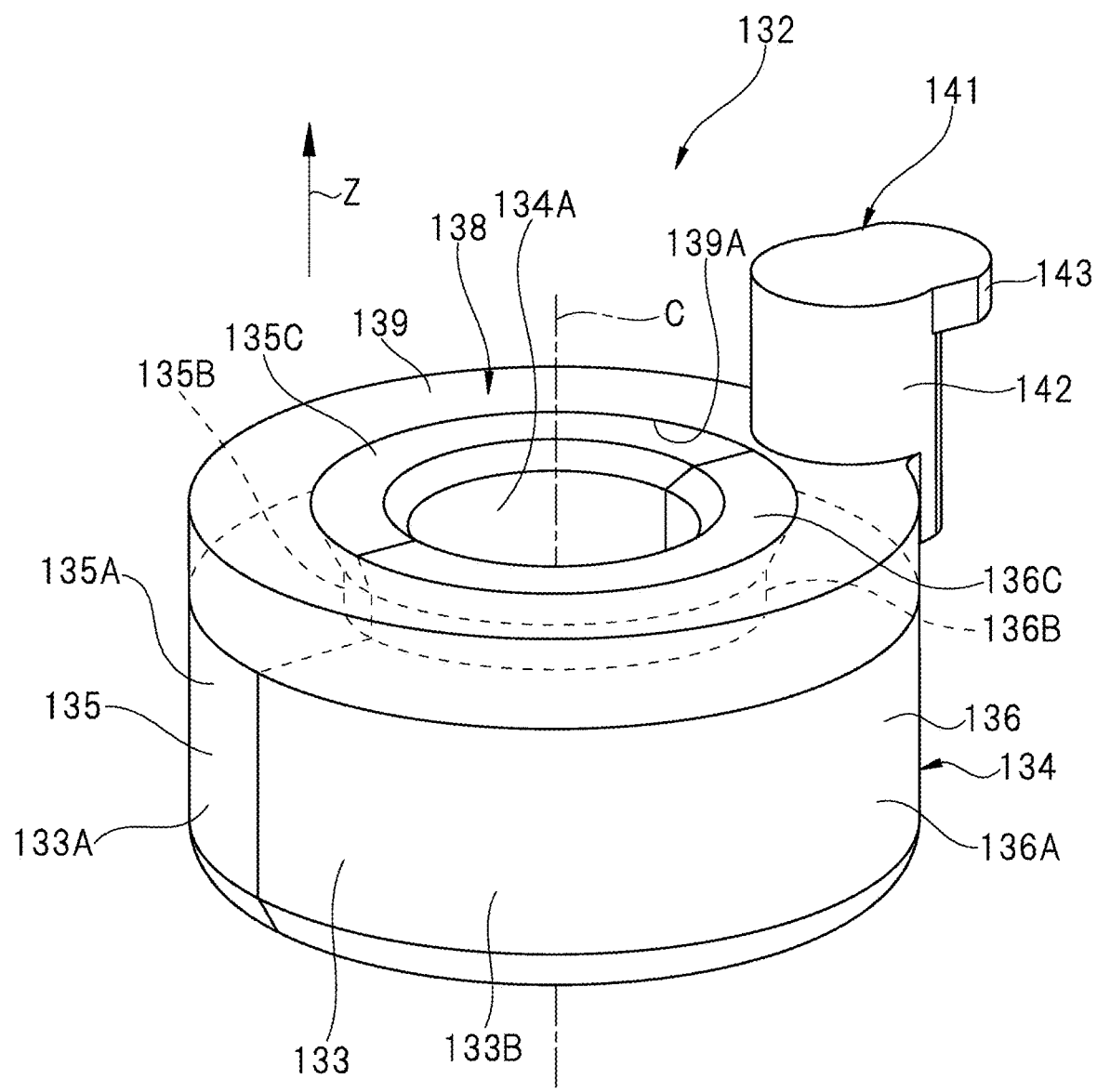
FIG. 7 is a perspective view of a detectable member in the first embodiment.

As shown in FIG. 7, the detectable member 132 includes a rotor magnet 134 and a transmission member 138. The rotor magnet 134 is an example detectable member to be detected by the detector 152 (FIG. 6) described later. The rotor magnet 134 is a cylinder with the central axis C extending in the optical axis direction. The rotor magnet 134 has a circular hole 134A centered on the central axis C. The rotor magnet 134 includes a first magnet 135 and a second magnet 136. The detectable member 132 has an outer circumferential surface 133 including an outer peripheral surface 133A of the first magnet 135 and an outer peripheral surface 133B of the second magnet 136.

The first magnet 135 is an example first detectable portion. The first magnet 135 is semiannular as viewed in the optical axis direction. The first magnet 135 has, for example, the north (N) pole. The first magnet 135 includes a larger-diameter portion 135A, a smaller-diameter portion 135B, and a flared portion 135C. The larger-diameter portion 135A is semiannular. The smaller-diameter portion 135B has a smaller radius than the larger-diameter portion 135A and extends upright from an upper surface of the larger-diameter portion 135A. The flared portion 135C extends upward from the smaller-diameter portion 135B, and has a larger radius than the smaller-diameter portion 135B.

The second magnet 136 is an example second detectable portion. The second magnet 136 is semiannular as viewed in the optical axis direction. The second magnet 136 has, for example, the south (S) pole. The second magnet 136 includes a larger-diameter portion 136A, a smaller-diameter portion 136B, and a flared portion 136C. The larger-diameter portion 136A is semiannular. The smaller-diameter portion 136B has a smaller radius than the larger-diameter portion 136A and extends upright from an upper surface of the larger-diameter portion 136A. The flared portion 136C extends upward from the smaller-diameter portion 136B and has a larger radius than the smaller-diameter portion 136B. The second magnet 136 has its two end faces in the circumferential direction bonded to the two end faces of the first magnet 135 in the circumferential direction. The first magnet 135 and the second magnet 136 are thus arranged in a rotation direction (circumferential direction) of the detectable member 132 and have different polarities.

The transmission member 138 is an example transmission that comes into contact with the edges of the elongated hole 103 (FIG. 4) to receive a force (rotational force) from the blade 94. The transmission member 138 includes an attachment 139 and the hook 141. The attachment 139 is an annular plate as viewed in the optical axis direction and has a hole 139A. An edge of the hole 139A is fitted in the smaller-diameter portion 135B, the smaller-diameter portion 136B, the flared portion 135C, and the flared portion 136C to attach the attachment 139 to the rotor magnet 134. The attachment 139 has substantially the same outer diameter as the larger-diameter portion 135A and the larger-diameter portion 136A.

The hook 141 includes the columnar portion 142 and an extension 143. The columnar portion 142 protrudes radially from a part of the circumference of the attachment 139 and extends upright. The extension 143 extends radially outward from the upper end of the columnar portion 142 in the attachment 139. The columnar portion 142 and the extension 143 have their outer peripheral surfaces that are rounded.

Figure 8:
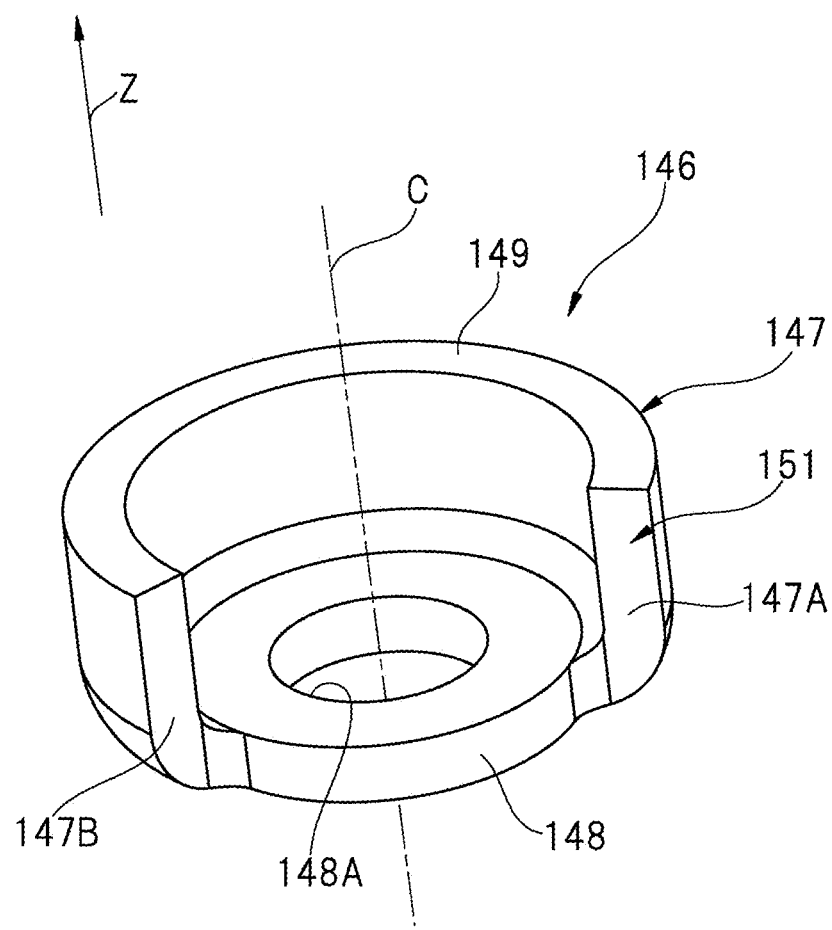
FIG. 8 is a perspective view of a yoke member in the first embodiment.

As shown in FIG. 8, the yoke member 146 includes a yoke body 147 and a window 151. The yoke body 147 includes a bottom wall 148 and a peripheral wall 149 and is open upward in the optical axis direction and open in the radial direction. The bottom wall 148 is annular as viewed in the optical axis direction. The bottom wall 148 has, at its center, a through-hole 148A centered on the central axis C. The through-hole 148A is circular as viewed in the optical axis direction. The yoke member 146 is formed from a magnetic material.

The peripheral wall 149 is a side wall extending upright in the optical axis direction from the outer edge of the bottom wall 148. The peripheral wall 149 is C-shaped as viewed in the optical axis direction. The peripheral wall 149 has an inner diameter substantially the same as the outer diameter of the rotor magnet 134 (FIG. 7). The yoke body 147 accommodates the first magnet 135 and the second magnet 136 (FIG. 7). The yoke body 147 is bonded to the first magnet 135 and the second magnet 136.

The window 151 is located in the yoke body 147. The window 151 includes a space between one end face 147A and the other end face 147B of the peripheral wall 149 in the circumferential direction and is open radially. In other words, the window 151 is cut out in the circumferential direction from the peripheral wall 149 being a cylinder. The window 151 is open within a range of, for example, a central angle of about 120° as viewed in the optical axis direction. The window 151 may be open within a range of a central angle other than 120°.

As shown in FIG. 6, the support shaft 62 is received in the circular hole 134A. This allows the detectable member 132 to rotate about the central axis C extending in the optical axis direction in the base 32. When the blade 94 (FIG. 3) comes into contact with the hook 141 while moving in the intersecting direction, the detectable member 132 rotates about the support shaft 62, changing the circumferential positions of the first magnet 135 and the second magnet 136.

Figure 9:
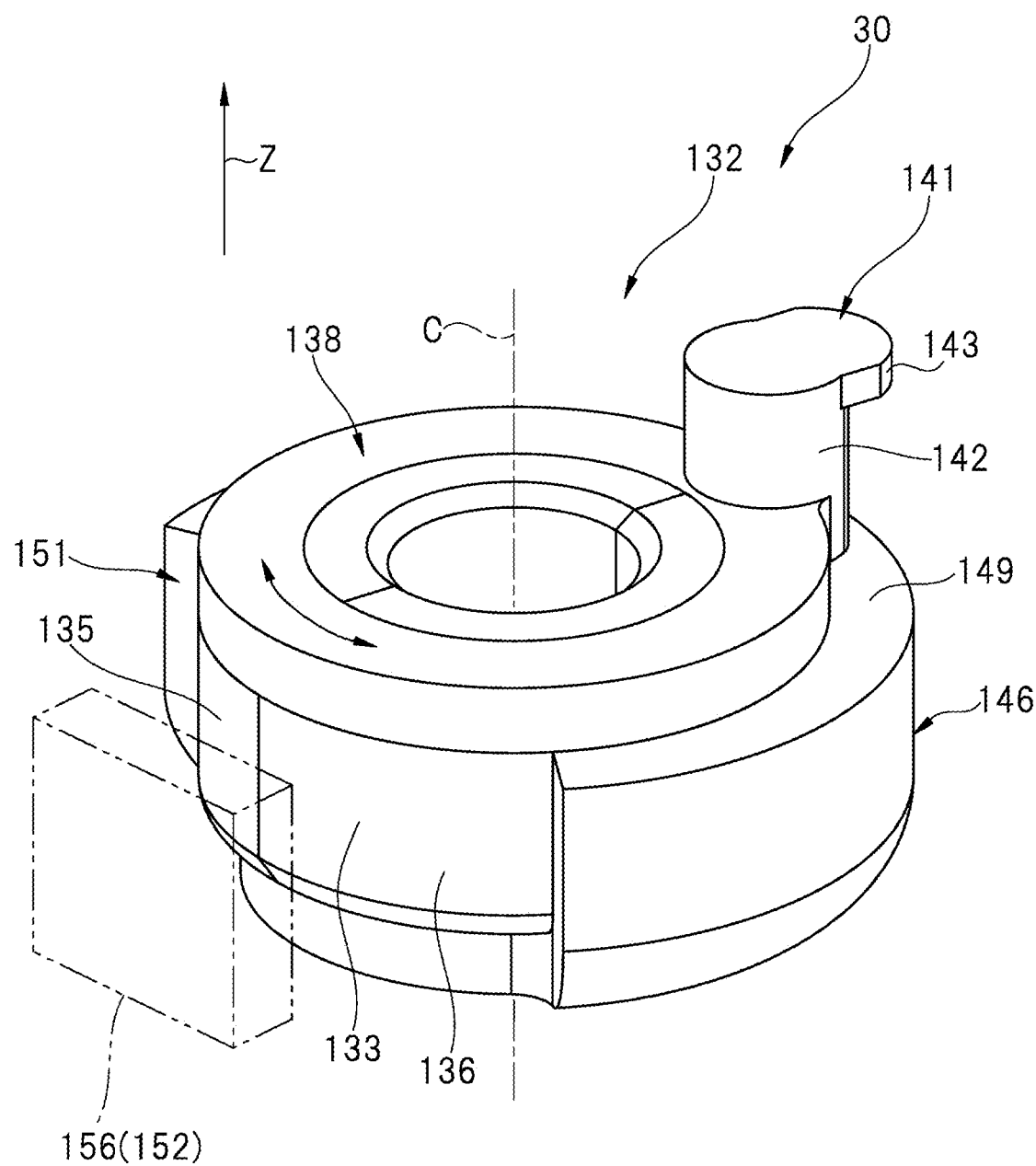
FIG. 9 is a perspective view of the detectable member in the first embodiment in a detectable state.

As shown in FIG. 9, the window 151 exposes the first magnet 135 and the second magnet 136 outward from the peripheral wall 149. The window 151 faces the detector 152 (described later) in the radial direction of the yoke member 146. This causes the detector 152 to face the outer circumferential surface 133 through the window 151.

As shown in FIG. 3, the movement of the blade 94 in the intersecting direction is restricted between the projection 112A and the side plate 92. This restricts the range in which the detectable member 132 in FIG. 9 is rotatable (swingable). More specifically, each component is arranged to cause either the first magnet 135 or the second magnet 136 to constantly face the detector 152 within the range in which the detectable member 132 is rotatable.

Detector

As shown in FIG. 6, the detector 152 includes a substrate 154 and a Hall integrated circuit (IC) 156 mounted on the substrate 154. The Hall IC 156 detects the polarity (pole) of a magnet based on a change in the direction of a voltage orthogonal to the directions of a current and the magnetic field. In this manner, the detector 152 detects either the first magnet 135 or the second magnet 136. More specifically, the detector 152 detects switching of the magnetic poles by detecting either the N pole of the first magnet 135 or the S pole of the second magnet 136. The detector 152 detects the first magnet 135 when the blade 94 (FIG. 3) is at the opening position. The detector 152 detects the second magnet 136 when the blade 94 is at the closing position.

Effects of First Embodiment

Figure 10:
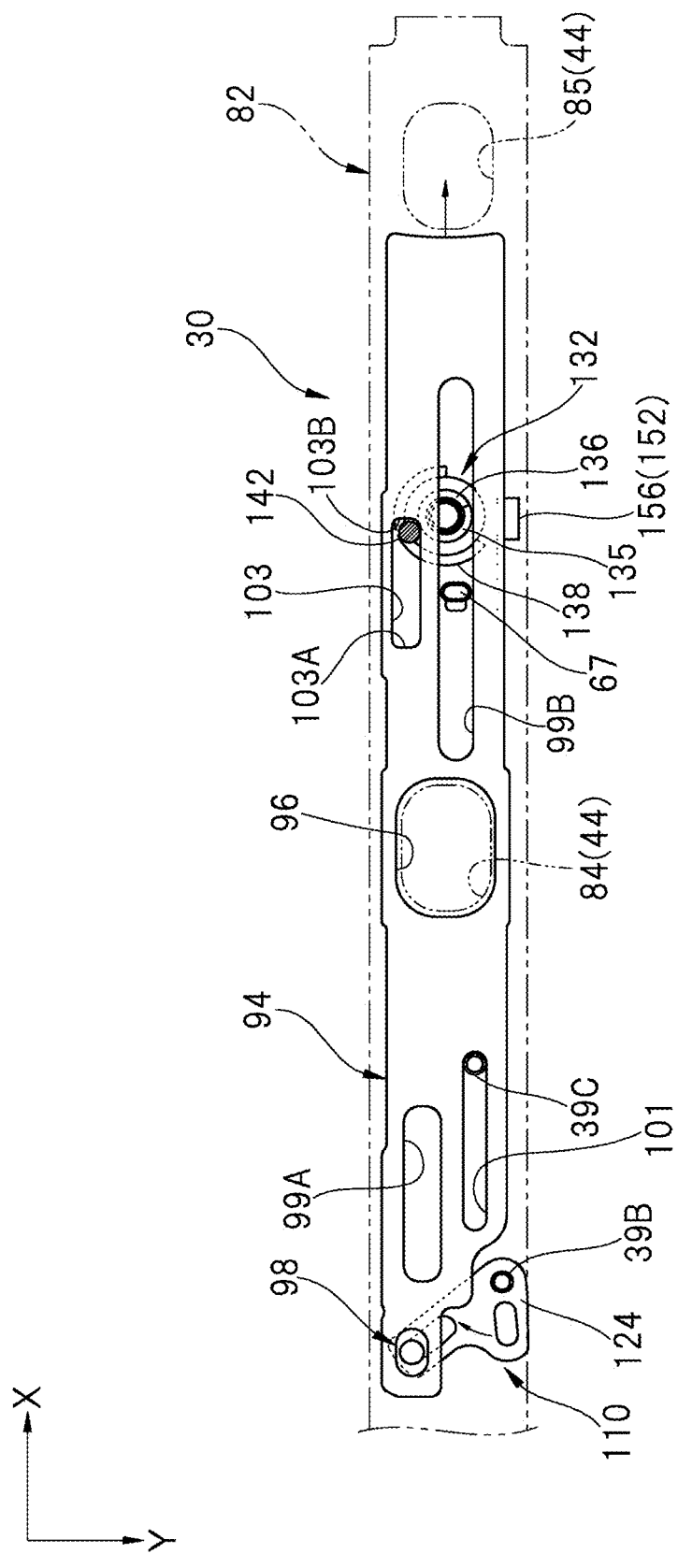
FIG. 10 is a plan view of the blade in the first embodiment uncovering an opening portion.
Figure 11:
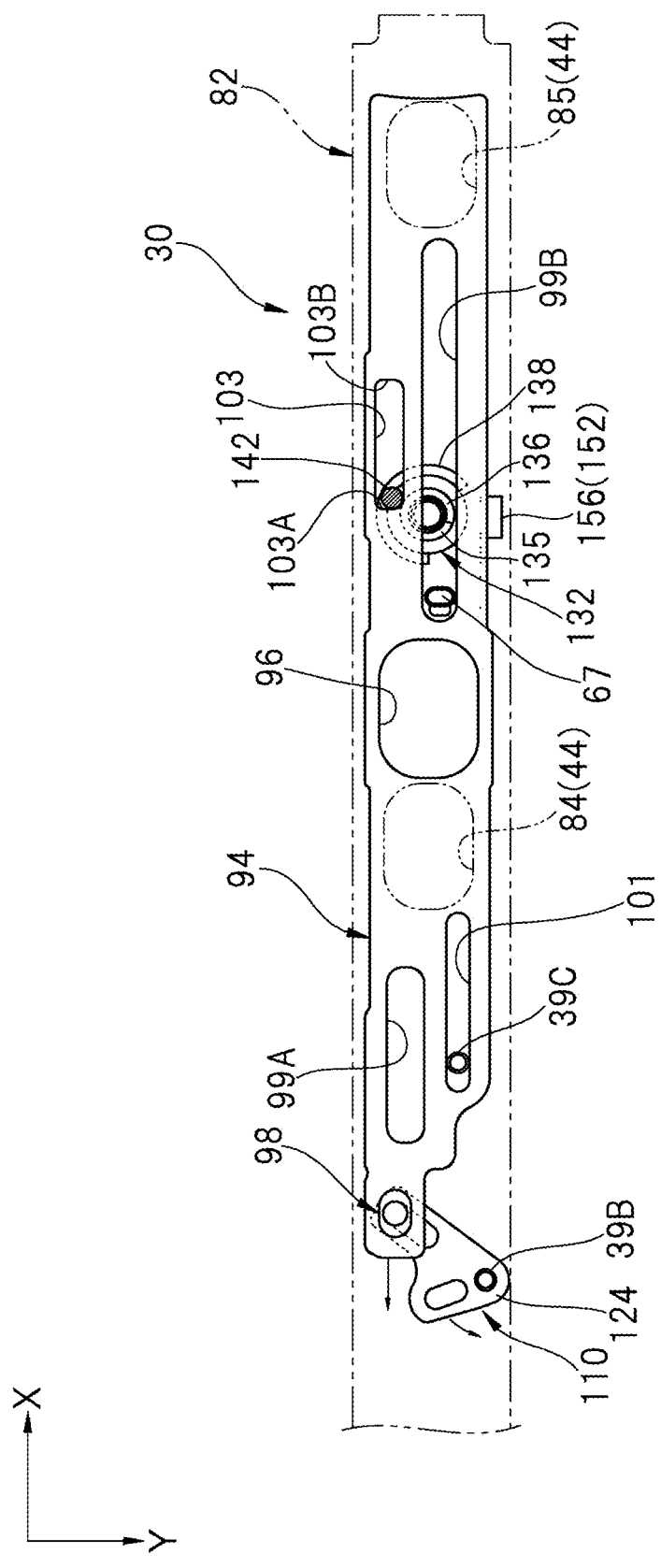
FIG. 11 is a plan view of the blade in the first embodiment covering the opening portion.

FIG. 10 shows the blade 94 at the opening position. FIG. 11 shows the blade 94 at the closing position. The actuator unit 110 moves the blade 94 to either the closing position or the opening position. FIGS. 10 and 11 mainly show the cover 82, the blade 94, the actuator unit 110 (cam plate 124), the detectable member 132, and the Hall IC 156 and do not show other components.

As shown in FIG. 10, the detector 152 detects the first magnet 135 when the blade 94 is at the opening position. The actuator unit 110 then starts operating, causing the cam plate 124 to rotate clockwise about the boss 39B in the figure. The cam plate 124 moves the engagement member 98 rightward in the intersecting direction. In other words, the blade 94 moves rightward in the intersecting direction. The first edge 103A of the blade 94 moving rightward comes into contact with the columnar portion 142, causing the detectable member 132 to rotate clockwise in the figure. This changes the circumferential positions of the first magnet 135 and the second magnet 136. The detector 152 then detects the second magnet 136 to detect the blade 94 covering the opening portion 44 at the closing position.

As shown in FIG. 11, the detector 152 detects the second magnet 136 when the blade 94 is at the closing position. The actuator unit 110 then starts operating, causing the cam plate 124 to rotate counterclockwise about the boss 39B in the figure. The cam plate 124 moves the engagement member 98 leftward in the intersecting direction. In other words, the blade 94 moves leftward in the intersecting direction. The second edge 103B of the blade 94 moving leftward comes into contact with the columnar portion 142, causing the detectable member 132 to rotate counterclockwise in the figure. This changes the circumferential positions of the first magnet 135 and the second magnet 136. The detector 152 then detects the first magnet 135 to detect the blade 94 uncovering the opening portion 44 at the opening position.

Figure 12:
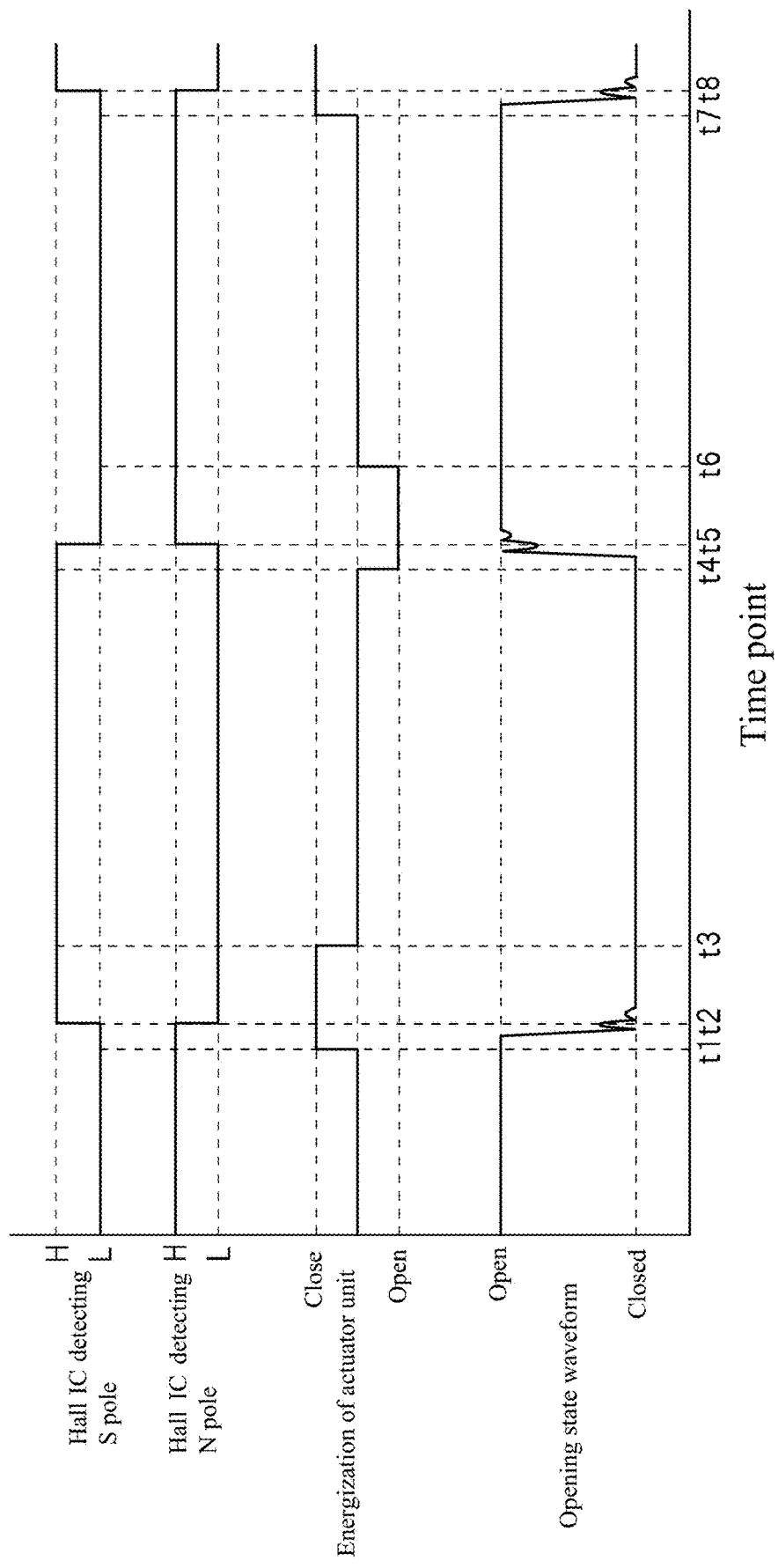
FIG. 12 is a timing chart showing, in the blade open-close device according to the first embodiment, the detection states of magnetic poles with a Hall IC, the energization state of an actuator unit, and an opening state waveform.

FIG. 12 is a timing chart of an operation of the blade open-close device 30. Each component of the blade open-close device 30 is described with reference to FIGS. 3, 6, and 9. FIG. 12 shows the detection states of the magnetic poles with the Hall IC 156, the energization state of the actuator unit 110, and an opening state waveform showing whether the blade 94 is covering or uncovering the opening portion 44. Time points from a time point t1 to a time point t8 each refer to an example time point or time, and do not refer to an absolute time point or time.

In the actuator unit 110, the coil 113 is energized from the time point t1 to the time point t3 and at the time point t7 and time points subsequent to the time point t7 to move the blade 94 to the closing position. The coil 113 is energized from the time point t4 to the time point t6 to move the blade 94 to the opening position. The coil 113 in the actuator unit 110 is also energized for resetting, which is not shown in FIG. 12. The opening state waveform shows whether the opening portion 44 is covered or uncovered. The open state indicates that the opening portion 44 is fully uncovered. The closed state indicates that the opening portion 44 is fully covered. The area between the open state and the closed state indicates that a part of the opening portion 44 is covered, and the remaining part of the opening portion 44 is uncovered.

For the Hall IC 156, H indicates a higher output, and L indicates a lower output. The N pole refers to the pole of the first magnet 135, and the S pole refers to the pole of the second magnet 136. The Hall IC 156 detects the N pole at the time points t1, t6, and t7. The Hall IC 156 detects the switching from the N pole to the S pole at the time points t2 and t8. The Hall IC 156 detects the S pole at the time points t3 and t4. The Hall IC 156 detects the switching from the S pole to the N pole at the time point t5. The Hall IC 156 detects a different pole at this time point after the coil 113 is energized and the opening state waveform starts changing. This shows that the blade 94 comes into contact with the detectable member 132 while moving.

As described above, when the actuator unit 110 moves the blade 94 to the closing position or the opening position in the blade open-close device 30, the moving (accelerating) blade 94 comes into contact with the detectable member 132. In a comparative example in which the magnets are fixed to the blade 94, torque corresponding to the weight of the magnets acts on the actuator unit 110 when the blade 94 starts moving (before accelerating).

In contrast, in the blade open-close device 30, the blade 94 comes into contact with the detectable member 132 while moving. Thus, torque from the detectable member 132 is less likely to act on the actuator unit 110 when the blade 94 starts moving. The torque acting on the actuator unit 110 in the blade open-close device 30 is thus less than in the comparative example described above. In other words, the blade open-close device 30 can avoid increasing torque for the actuator unit 110 in detecting the position of the blade 94.

As shown in FIG. 6, the detectable member 132 in the blade open-close device 30 is rotatable. This allows the detectable member 132 to be accommodated in a smaller space than a detectable member 132 extending in the intersecting direction. The blade open-close device can thus be smaller. Further, as shown in FIGS. 10 and 11, the detectable member 132 is circular. This allows the detectable member 132 to move (rotate) easily with less force than a rectangular detectable member that slides when the transmission member 138 comes into contact with the first edge 103A or the second edge 103B of the elongated hole 103 to receive a force transmitted from the blade 94.

As shown in FIGS. 6, 10, and 11, when the blade 94 is moving in the intersecting direction in the blade open-close device 30, the transmission member 138 comes into contact with the first edge 103A or the second edge 103B of the elongated hole 103 to receive a force transmitted from the blade 94. This causes the detectable member 132 to rotate, switching the positions of the first magnet 135 and the second magnet 136. As described above, the detectable member 132 can rotate with a simple structure including the transmission member 138.

As shown in FIG. 9, the blade open-close device 30 including the yoke member 146 formed from a magnetic material can increase magnetic forces from the first magnet 135 and the second magnet 136. The blade open-close device 30 including the yoke member 146 can also reduce magnetic leakage from the first magnet 135 and the second magnet 136. Further, with the yoke member 146 including the window 151 that exposes a part of the first magnet 135 and a part of the second magnet 136, the detector 152 can perform detection based on a higher magnetic force. The detector 152 can thus detect the position of the blade 94 in the intersecting direction with less erroneous detection.

As shown in FIGS. 10 and 11, the detector 152 in the blade open-close device 30 faces the outer circumferential surface 133 of the detectable member 132 (FIG. 7). The blade 94 moves in the intersecting direction as viewed in the optical axis direction to cover or uncover the opening portion 44. The blade 94 does not move to a position facing the outer circumferential surface 133. The detector 152 is thus not located in an area in which the blade 94 is movable and is less likely to interfere with the movement of the blade 94.

As shown in FIGS. 3, 10, and 11, the blade 94 in the blade open-close device 30 covers or uncovers the openings 45, 78, 84, and 85. In other words, the blade open-close device 30 includes a single blade 94 to cover or uncover multiple openings. This allows the blade open-close device 30 not to include the blade 94 and the actuator unit 110 for each opening, reducing its size increase.

The laptop personal computer 10 shown in FIG. 1 includes the blade open-close device 30 and thus produces the same effects as the blade open-close device 30 described above. Further, the blade open-close device 30 can avoid increasing torque and reduce size increase of the actuator unit 110, thus reducing size increase of the laptop personal computer 10.

Second Embodiment

An electronic device and a blade open-close device according to a second embodiment of the present invention will now be described with reference to FIG. 13. Like reference numerals denote the same or like components as those in the first embodiment. Such components will not be described repeatedly.

Figure 13:
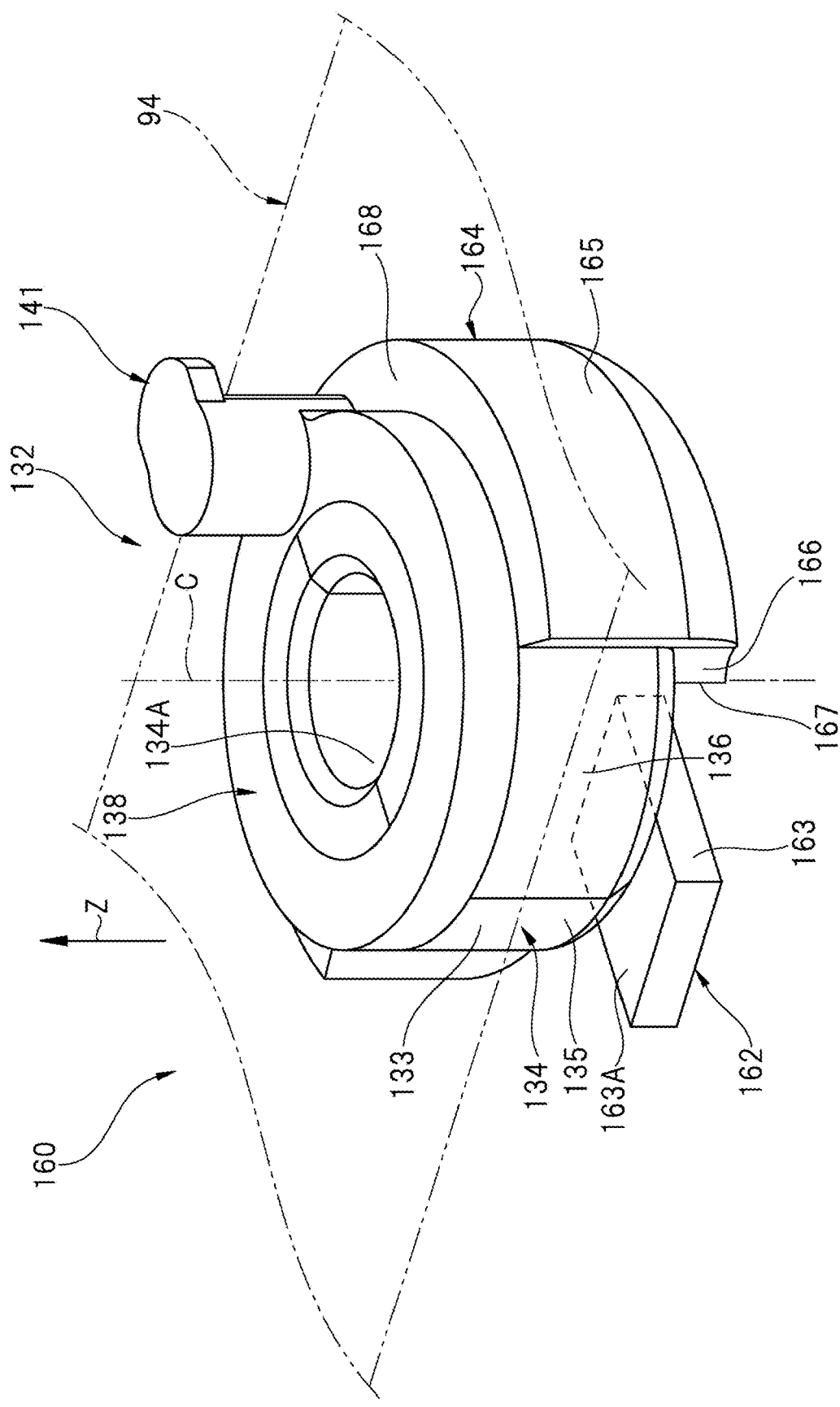
FIG. 13 is a perspective view of a rotor magnet and a Hall IC in a blade open-close device according to a second embodiment, showing their arrangement.

FIG. 13 shows a part of a blade open-close device 160 according to the second embodiment. The blade open-close device 160 includes a detector 162 and a yoke member 164 in place of the detector 152 and the yoke member 146 (FIG. 3) in the blade open-close device 30 (FIG. 3). The blade open-close device 160 has the same structure as the blade open-close device 30 except the detector 162 and the yoke member 164.

The detector 162 includes a substrate (not shown) and a Hall IC 163 mounted on the substrate. The Hall IC 163 has an upper surface in the optical axis direction, which is referred to as a detection surface 163A. The detector 162 faces, in the optical axis direction, a portion of the detectable member 132 opposite to a portion of the detectable member 132 facing the blade 94. More specifically, the blade 94 faces, in the optical axis direction, a portion above the middle of the detectable member 132 in the optical axis direction. The detector 162 faces, in the optical axis direction, a portion below the middle of the detectable member 132 in the optical axis direction.

The yoke member 164 includes a yoke body 165 and a window 167. The yoke body 165 includes a bottom wall 166 and a peripheral wall 168. The bottom wall 166 is C-shaped as viewed in the optical axis direction. The bottom wall 166 has, at its center, a through-hole (not shown) centered on the central axis C. The yoke member 164 is formed from a magnetic material. The peripheral wall 168 is a side wall extending upright in the optical axis direction from the outer edge of the bottom wall 166. The peripheral wall 168 is C-shaped as viewed in the optical axis direction. The peripheral wall 168 has an inner diameter substantially the same as the outer diameter of the rotor magnet 134. The yoke body 165 accommodates the first magnet 135 and the second magnet 136. The yoke body 165 is bonded to the first magnet 135 and the second magnet 136.

The window 167 is located in the yoke body 165. The window 167 is, for example, a cutout in the bottom wall 166 and is open in the radial direction and in the optical axis direction. The first magnet 135, the second magnet 136, and the boundary between the first magnet 135 and the second magnet 136 are, below the middle of the detectable member 132 in the optical axis direction, partially exposed downward through the window 167. The Hall IC 163 is partially placed inward through the window 167. This structure causes the detection surface 163A to face a lower surface of the first magnet 135 and a lower surface of the second magnet 136 in the optical axis direction. The Hall IC 163 is not in contact with the support shaft 62 (FIG. 3) or the detectable member 132 irrespective of whether the detectable member 132 is rotating. The peripheral wall 168 may cover the entire outer circumferential surface 133.

Effects of Second Embodiment

When the detectable member 132 rotates (swings) about the central axis C, the Hall IC 163 detects the N pole or the S pole, allowing the detector 162 to detect the switching of the magnetic poles. The detector 162 detects the first magnet 135 (N pole) when the blade 94 is at the opening position. The detector 162 detects the second magnet 136 (S pole) when the blade 94 is at the closing position. With the detector 162 located below the detectable member 132, the detector 162 does not come into contact with the blade 94 and can avoid restricting the range in which the blade 94 is movable.

Third Embodiment

An electronic device and a blade open-close device according to a third embodiment of the present invention will now be described with reference to FIGS. 14 to 17. Like reference numerals denote the same or like components as those in the first and second embodiments. Such components will not be described repeatedly.

Figure 14:
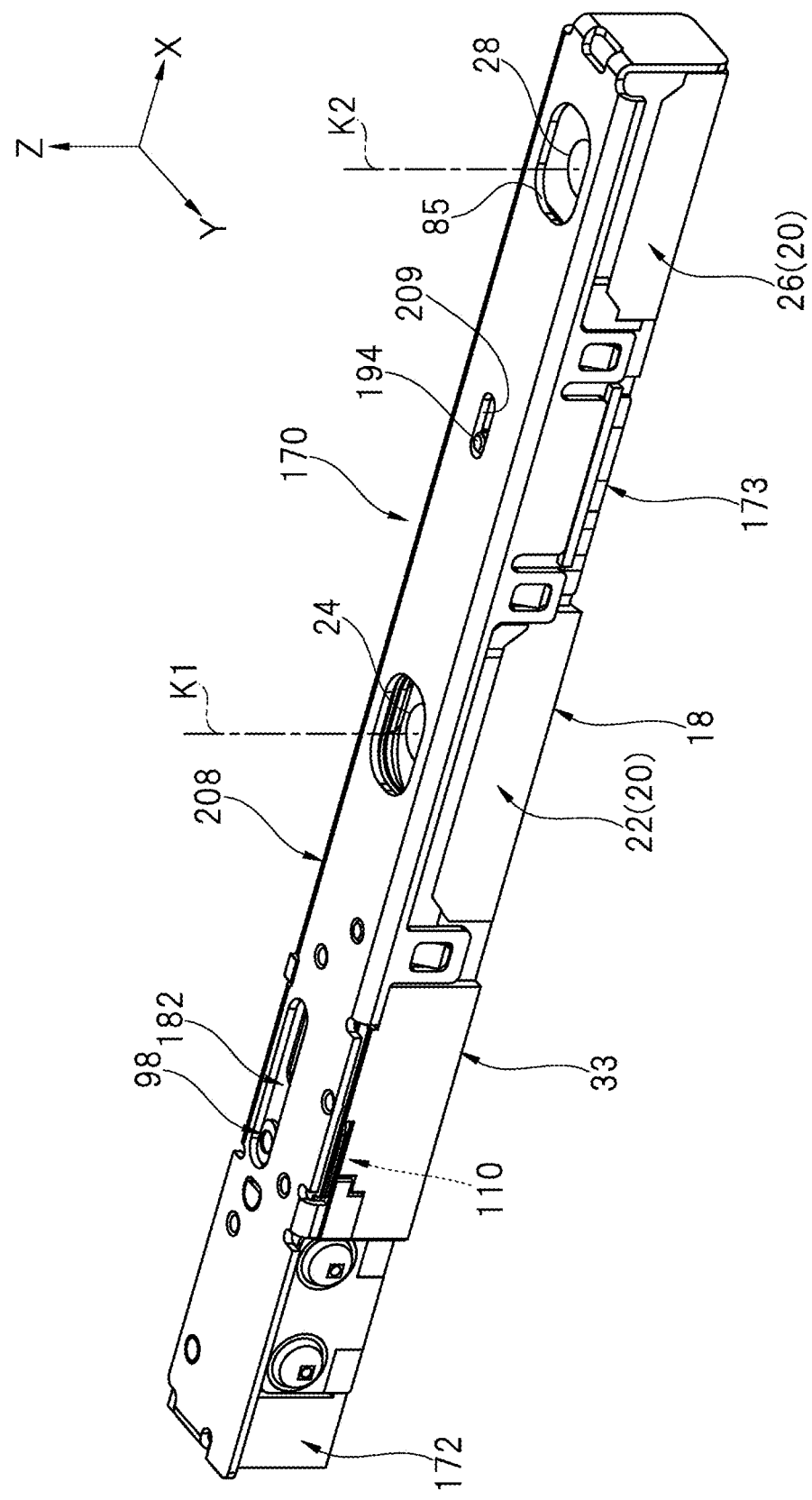
FIG. 14 is a perspective view of a blade open-close device according to a third embodiment.
Figure 15:
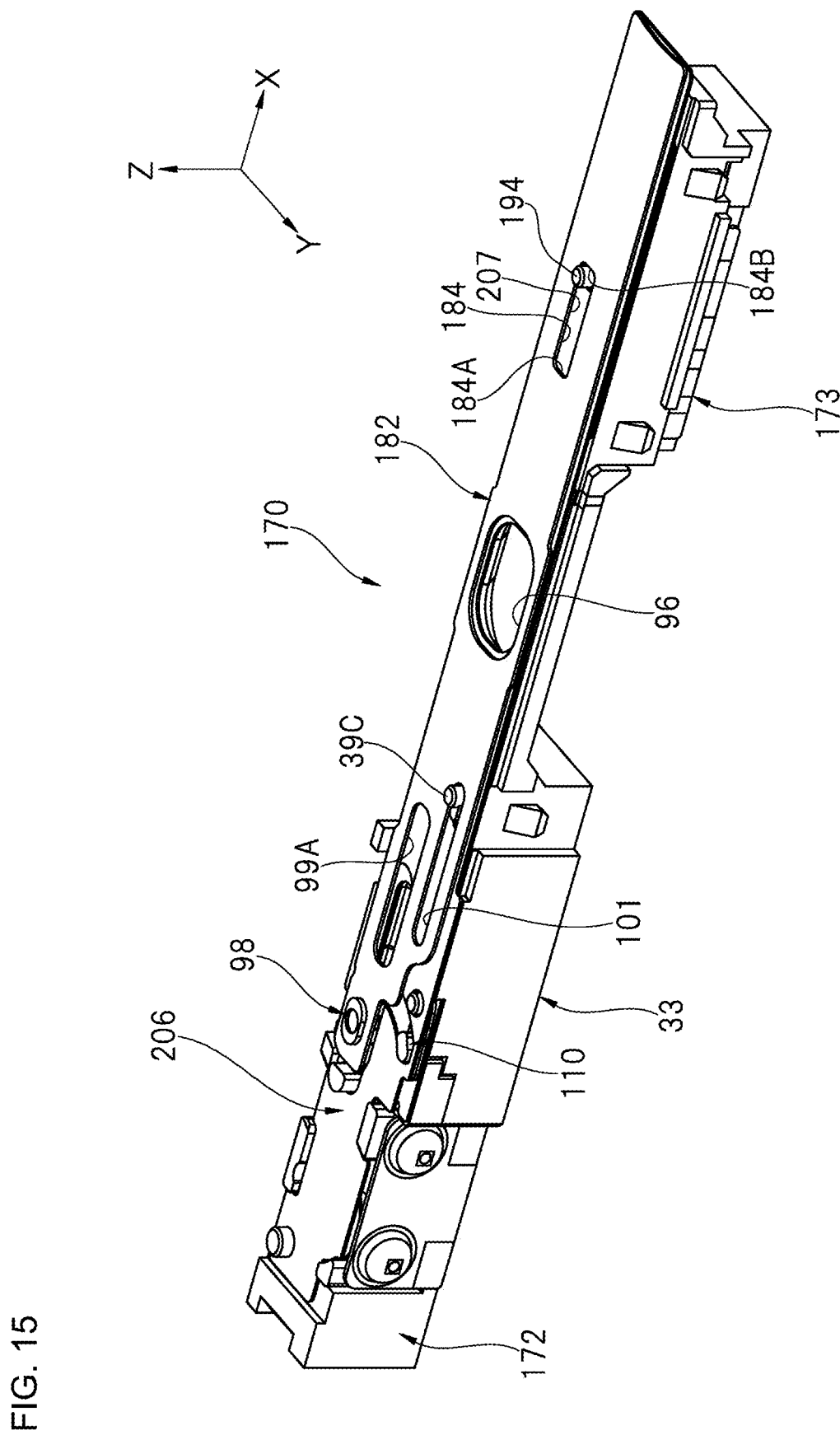
FIG. 15 is a perspective view of the blade open-close device according to the third embodiment with a cover and lens units removed.
Figure 17:
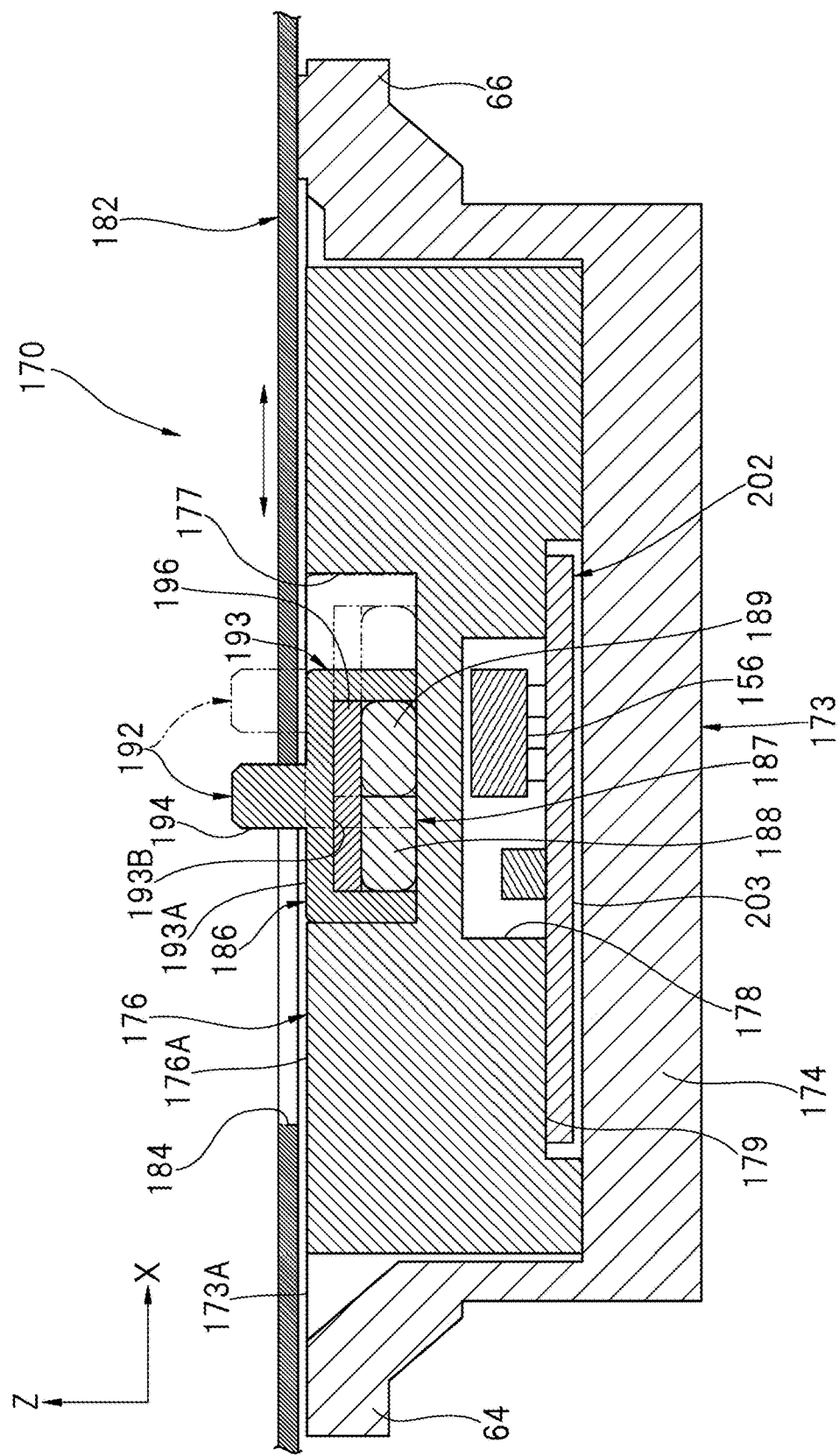
FIG. 17 is a longitudinal sectional view (sectional view taken along line 17-17 in FIG. 16) of the second housing in the blade open-close device according to the third embodiment, showing its components.

FIGS. 14, 15, and 17 illustrate a blade open-close device 170 according to the third embodiment. The blade open-close device 170 includes a base 172, a blade 182, the actuator unit 110, a detectable member 186, a yoke member 196, and a detector 202. The blade open-close device 170 further includes a partition 206 and a cover 208.

The base 172 is an example body. The base 172 is attached to a module board (not shown). The base 172 includes the first housing 33 and a second housing 173. The first housing 33 and the second housing 173 may be integral with or separate from each other.

Figure 16:
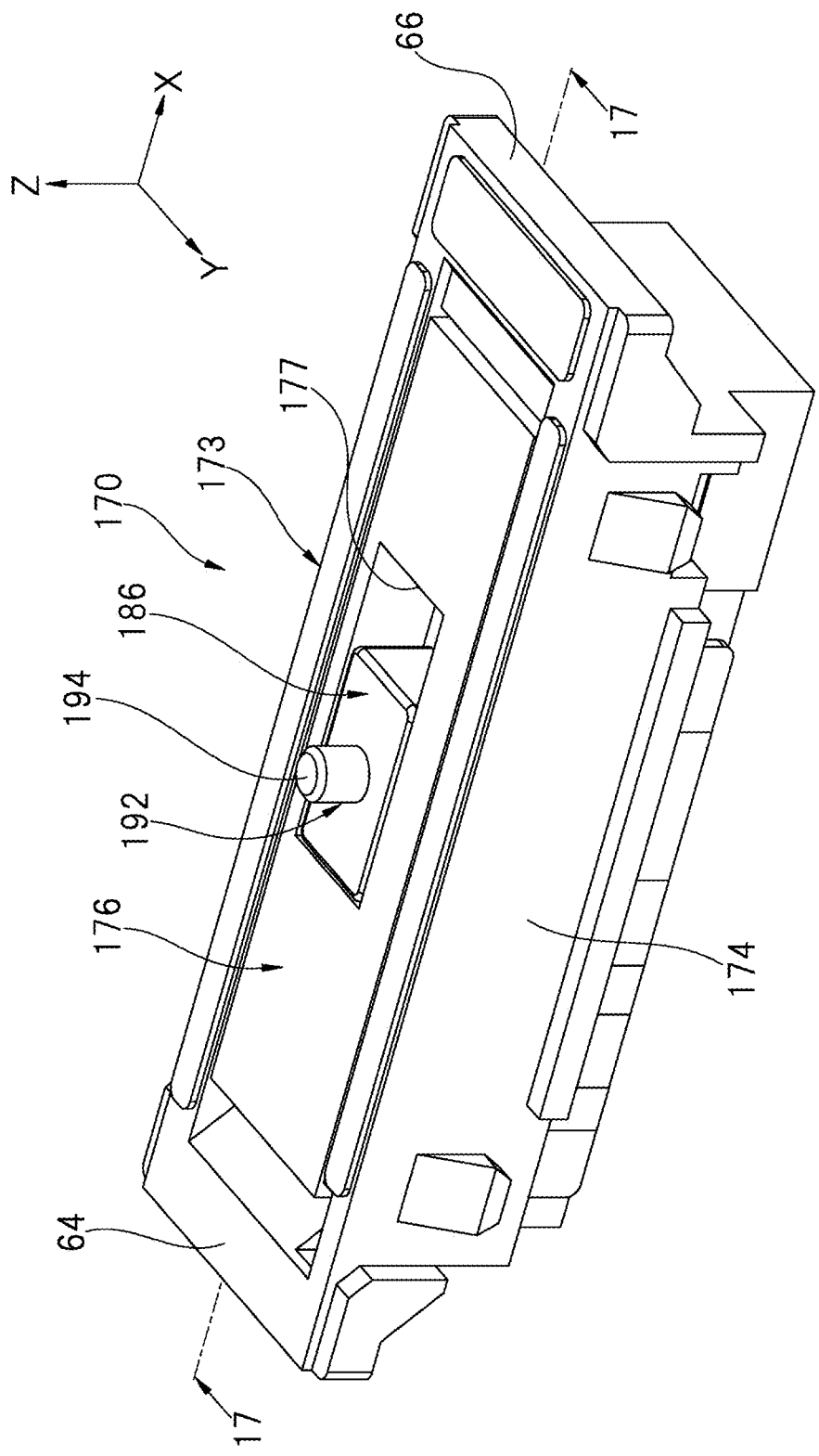
FIG. 16 is a perspective view of a second housing in the blade open-close device according to the third embodiment, showing its components.

As shown in FIG. 16, the second housing 173 includes a second compartment 174, the connector 64, and the flange 66. The second compartment 174 is open upward. The second compartment 174 accommodates a holder 176, the detectable member 186, the yoke member 196, and the detector 202 (FIG. 17) described later inside. The second housing 173 includes a through-hole (not shown) to expose a part of a substrate 203 (FIG. 17) described later frontward.

As shown in FIG. 17, the holder 176 is a rectangular prism elongated in the intersecting direction. The holder 176 has an upper surface 176A flush with an upper surface 173A of the second housing 173. The holder 176 has, on its upper middle portion, a first recess 177 that is open upward. The first recess 177 is a rectangle longer in the intersecting direction than in the front-rear direction as viewed from above. The first recess 177 accommodates the detectable member 186 and the yoke member 196 (described later) inside. The holder 176 has, on its lower middle portion, a second recess 178 that is open downward. The second recess 178 accommodates the Hall IC 156 inside. The second recess 178 has a periphery 179 to which the substrate 203 (described later) is attached.

As shown in FIG. 15, the blade 182 includes an elongated hole 184 in place of the guide hole 99B and the elongated hole 103 (FIG. 4) in the blade 94 (FIG. 4). The elongated hole 184 is located on the right of the opening 96 in the intersecting direction. The elongated hole 184 is an example groove and extends through the blade 182 in the optical axis direction. The elongated hole 184 is elongated in the intersecting direction as viewed in the optical axis direction. The elongated hole 184 receives a columnar portion 194 (described later). The elongated hole 184 has a first edge 184A at its left end and a second edge 184B at its right end. The first edge 184A and the second edge 184B come into contact with the columnar portion 194 when the blade 182 moves in the intersecting direction.

As shown in FIG. 17, the detectable member 186 includes a magnet 187 and a transmission member 192. The magnet 187 is an example detectable member to be detected by the detector 202 (described later). The magnet 187 is a plate having a predetermined thickness in the optical axis direction and extending in the intersecting direction. The magnet 187 includes a first magnet 188 and a second magnet 189. The first magnet 188 and the second magnet 189 are arranged in the intersecting direction.

The first magnet 188 is an example first detectable portion. The first magnet 188 is a rectangle longer in the intersecting direction than in the front-rear direction as viewed in the optical axis direction. The first magnet 188 has, for example, the N pole.

The second magnet 189 is an example second detectable portion. The second magnet 189 is a rectangle longer in the intersecting direction than in the front-rear direction as viewed in the optical axis direction. The second magnet 189 has, for example, the S pole. The second magnet 189 is located on the right of the first magnet 188 in the intersecting direction.

The transmission member 192 comes into contact with the first edge 184A and the second edge 184B of the elongated hole 184 (FIG. 15) to receive a force transmitted from the blade 182. The transmission member 192 includes a base portion 193 and the columnar portion 194. The base portion 193 is a rectangular prism elongated in the intersecting direction. The base portion 193 is accommodated in the first recess 177. The base portion 193 is in contact with an inner wall of the first recess 177 to be guided in the intersecting direction. Thus, the detectable member 186 can reciprocate in the intersecting direction. The base portion 193 has an upper surface 193A at its upper end. The upper surface 193A is flush with the upper surface 176A. The base portion 193 has, on its lower middle portion, a recess 193B that is open downward. The columnar portion 194 extends upright from a center portion of the upper surface 193A in the intersecting direction. The columnar portion 194 is a cylinder. The columnar portion 194 is received in the elongated hole 184.

The yoke member 196 is a plate having a predetermined thickness in the optical axis direction. The yoke member 196 is a rectangle longer in the intersecting direction than in the front-rear direction as viewed in the optical axis direction. The yoke member 196 is accommodated in the recess 193B and fixed to the ceiling of the recess 193B. The magnet 187 is below the yoke member 196 and fixed in the recess 193B.

The detector 202 includes the substrate 203 and the Hall IC 156 mounted on the substrate 203. The substrate 203 is a flexible printed circuit (FPC). The substrate 203 is bent into an L shape as viewed in the intersecting direction. The substrate 203 has its front portion extending outside the second housing 173 and bent. The Hall IC 156 aligns with the magnet 187 in the optical axis direction. The detector 202 detects the switching of the magnetic poles by detecting the N pole of the first magnet 188 or the S pole of the second magnet 189. The detector 202 detects the second magnet 189 when the blade 182 is at the opening position. The detector 202 detects the first magnet 188 when the blade 182 is at the closing position.

As shown in FIG. 15, the partition 206 has a guide hole 207 in place of the guide hole 77 (FIG. 3) in the partition 72 (FIG. 3). The partition 206 has the same structure as the partition 72 except the guide hole 207. The guide hole 207 connects with the elongated hole 184 to guide the columnar portion 194 in the intersecting direction.

As shown in FIG. 14, the cover 208 has a guide hole 209 in place of the guide hole 89 (FIG. 2) in the cover 82 (FIG. 2). The cover 208 has the same structure as the cover 82 except the guide hole 209. The guide hole 209 connects with the elongated hole 184 (FIG. 15) to guide the columnar portion 194 in the intersecting direction.

Effects of Third Embodiment

The effects of the blade open-close device 170 will be described with reference to FIGS. 14 to 17. The detector 202 detects the second magnet 189 when the blade 182 is at the opening position. The actuator unit 110 then starts operating, causing the blade 182 to move rightward in the intersecting direction. The first edge 184A of the blade 182 moving rightward comes into contact with the columnar portion 194, causing the detectable member 186 to move rightward in the intersecting direction. This changes the position of the magnet 187 in the intersecting direction. The detector 202 then detects the first magnet 188 to detect the blade 182 covering the opening portion 44 at the closing position.

The detector 202 detects the first magnet 188 when the blade 182 is at the closing position. The actuator unit 110 then starts operating, causing the blade 182 to move leftward in the intersecting direction. The second edge 184B of the blade 182 moving leftward comes into contact with the columnar portion 194, causing the detectable member 186 to move leftward in the intersecting direction. This changes the position of the magnet 187 in the intersecting direction. The detector 202 then detects the second magnet 189 to detect the blade 182 uncovering the opening portion 44 at the opening position.

In the blade open-close device 170, the blade 182 comes into contact with the detectable member 186 while moving (accelerating). Thus, torque from the detectable member 186 is less likely to act on the actuator unit 110 when the blade 182 starts moving. The torque acting on the actuator unit 110 in the blade open-close device 170 is thus less than in the comparative example described above. In other words, the blade open-close device 170 can avoid increasing torque for the actuator unit 110 in detecting the position of the blade 182.

Modifications

An electronic device and a blade open-close device according to a modification different from the first embodiment, the second embodiment, or the third embodiment of the present invention will now be described. Like reference numerals denote the same or like components as those in the first embodiment, the second embodiment, or the third embodiment. Such components will not be described repeatedly.

Figure 18:
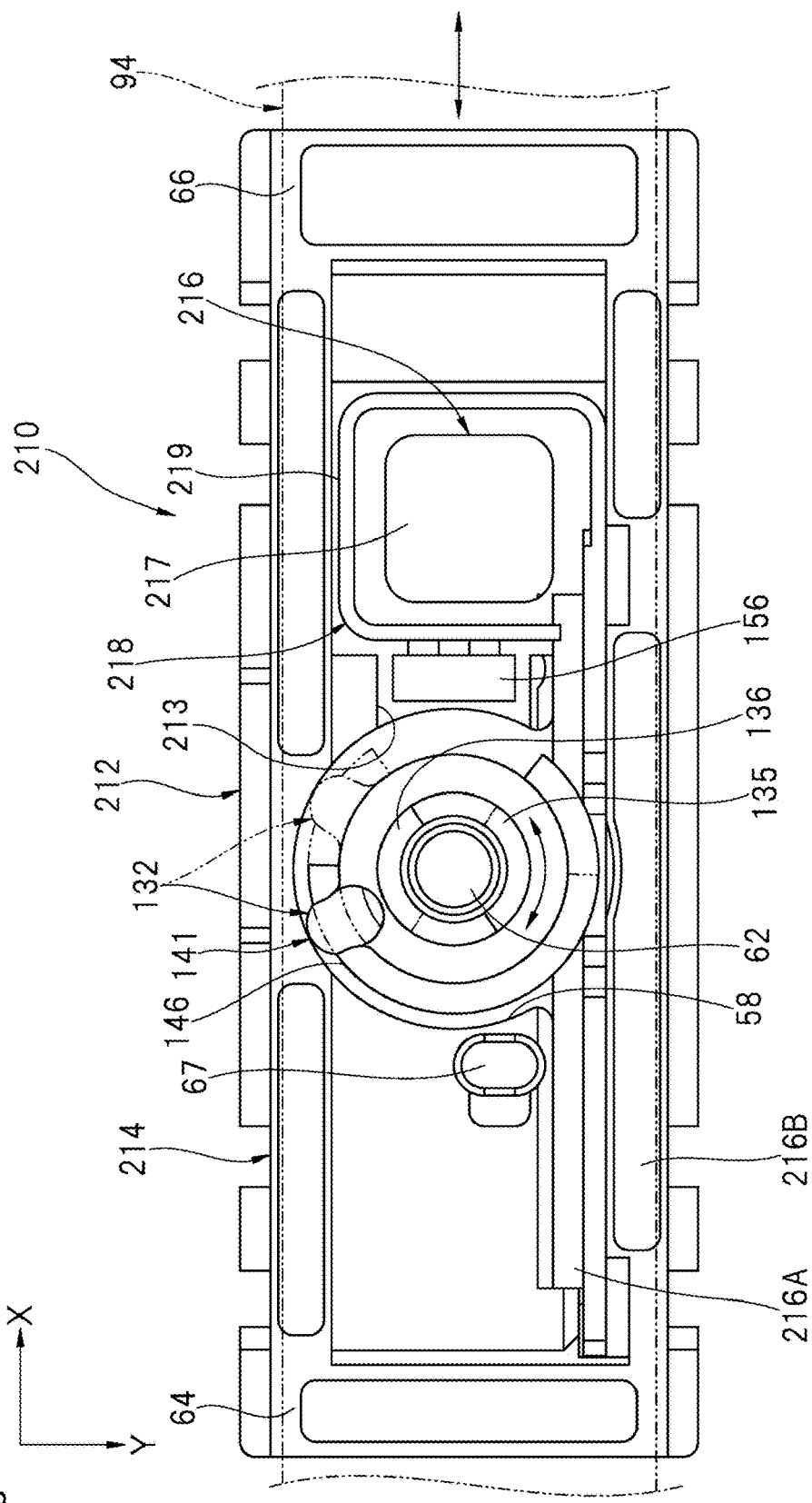
FIG. 18 is a plan view of a part of a blade open-close device according to a modification of the first embodiment.

FIG. 18 shows a part of a blade open-close device 210 according to the modification. The blade open-close device 210 includes a second housing 212 and a detector 218 in place of the second housing 51 and the detector 152 (FIG. 3) in the blade open-close device 30 (FIG. 3).

The second housing 212 includes a second compartment 214, the connector 64, the flange 66, and the guide pin 67. The second compartment 214 is open upward. The second compartment 214 accommodates the detectable member 132, the yoke member 146, and the detector 218. More specifically, the second compartment 214 includes, for example, a mount 216, the recess 58, and the support shaft 62.

The mount 216 includes a vertical wall 216A and a vertical wall 216B spaced from each other in the front-rear direction and a post 217 on the right of the recess 58 in the intersecting direction. The post 217 extends upright in the optical axis direction from the bottom of the second compartment 214. The post 217 is a quadratic prism with its corners rounded. The post 217 has side surfaces extending in the intersecting direction or in the front-rear direction. The post 217 has a peripheral portion connected to the inside of the recess 58 through a through-space 213. The substrate 219 (described later) is placed between the vertical wall 216A and the vertical wall 216B, and a part of the substrate 219 is wound around and fixed to the post 217. This attaches the detector 218 to the mount 216.

The detector 218 includes the substrate 219 and the Hall IC 156 mounted on the substrate 219. The substrate 219 is an FPC. As viewed in the optical axis direction, a part of the substrate 219 is wound around the post 217, and the remaining part of the substrate 219 extends between the vertical wall 216A and the vertical wall 216B in the intersecting direction. The Hall IC 156 aligns with the first magnet 135 or the second magnet 136 in the intersecting direction. The detector 218 detects the switching of the magnetic poles by detecting the first magnet 135 or the second magnet 136. The detector 218 detects the first magnet 135 when the blade 94 is at the opening position. The detector 218 detects the second magnet 136 when the blade 94 is at the closing position. As described above, the detectable member 132 and the Hall IC 156 may align with each other in the intersecting direction.

Other Modifications

The electronic device incorporating the blade open-close device 30, 160, 170, or 210 is not limited to the laptop personal computer 10, but may be any other electronic device having the camera function, such as a smart speaker or a home security camera.

The blade open-close device 30 or 170 may include a bottomed groove in place of a through-hole such as the elongated hole 103 or 184. The blade open-close device 30 or 170 with a structure that can detect magnetic poles may not include the yoke member 146 or 196. The optical member may include a single lens unit or three or more lens units in place of two lens units 22 and 26. The blade open-close device 30 or 170 may include, for example, a linear slider as the drive, in place of the actuator unit 110.

A blade open-close device may include a first detectable portion and a second detectable portion that are reflectors with different reflectances and a detector that detects, based on the amount of light reflected from either of the reflectors, the first detectable portion or the second detectable portion to detect whether a blade is at the opening position or the closing position. A blade open-close device may include a Hall IC above the detectable member to avoid restricting movement of the blade.

The technique according to one or more embodiments of the present invention may provide the structure described below.

(1)

A blade open-close device, comprising:

a body including an opening portion on an optical axis of an optical member;

a blade movable in an intersecting direction intersecting with an optical axis direction of the optical member, the blade being configured to cover or uncover the opening portion;

a drive configured to move the blade to one of a closing position to cover the opening portion or an opening position to uncover the opening portion;

a detectable member including a first detectable portion and a second detectable portion, the detectable member being configured to change a position of the first detectable portion and a position of the second detectable portion in response to coming into contact with the blade moving; and a detector configured to detect the first detectable portion when the blade is at the opening position and detect the second detectable portion when the blade is at the closing position.

(2)

The blade open-close device according to (1), wherein the detectable member is rotatable about a central axis extending in the optical axis direction in the body, the first detectable portion and the second detectable portions are a first magnet and a second magnet arranged in a rotation direction of the detectable member, and the first magnet and the second magnet have different polarities, and the detector detects one of the first magnet or the second magnet.

(3)

The blade open-close device according to (2), further comprising:

a yoke member including a yoke body accommodating the first magnet and the second magnet, and a window located in the yoke body and exposing the first magnet and the second magnet, wherein the detector faces the first magnet and the second magnet through the window.

(4)

The blade open-close device according to (2) or (3), wherein the detector faces an outer circumferential surface of the detectable member.

(5)

The blade open-close device according to (2) or (3), wherein the detector faces, in the optical axis direction, a portion of the detectable member opposite to a portion of the detectable member facing the blade.

(6)

The blade open-close device according to any one of (1) to (5), wherein the blade includes a groove extending in the intersecting direction as viewed in the optical axis direction, and the detectable member includes a transmission to come into contact with an edge of the groove to receive a force transmitted from the blade.

(7)

The blade open-close device according to any one of (1) to (6), wherein the optical member includes a plurality of lens units, the opening portion includes a plurality of openings corresponding to the plurality of lens units, and the blade covers or uncovers the plurality of openings.

(8)

An electronic device, comprising:

the blade open-close device according to any one of (1) to (7).

What is claimed is:

1. A blade open-close device, comprising:

a body including an opening portion on an optical axis of an optical member;

a blade movable in an intersecting direction intersecting with an optical axis direction of the optical member, the blade being configured to cover or uncover the opening portion;

a drive configured to move the blade to one of a closing position to cover the opening portion or an opening position to uncover the opening portion;

a detectable member including a first detectable portion and a second detectable portion, the detectable member being configured to change a position of the first detectable portion and a position of the second detectable portion in response to coming into contact with the blade moving; and a detector configured to detect the first detectable portion when the blade is at the opening position and detect the second detectable portion when the blade is at the closing position.

2. The blade open-close device according to claim 1, wherein the detectable member is rotatable about a central axis extending in the optical axis direction in the body, the first detectable portion and the second detectable portions are a first magnet and a second magnet arranged in a rotation direction of the detectable member, and the first magnet and the second magnet have different polarities, and the detector detects one of the first magnet or the second magnet.

3. The blade open-close device according to claim 2, wherein the blade includes a groove extending in the intersecting direction as viewed in the optical axis direction, and the detectable member includes a transmission to come into contact with an edge of the groove to receive a force transmitted from the blade.

4. The blade open-close device according to claim 3, further comprising:
a yoke member including
a yoke body accommodating the first magnet and the second magnet, and
a window located in the yoke body and exposing the first magnet and the second magnet,
wherein the detector faces the first magnet and the second magnet through the window.

5. The blade open-close device according to claim 3, wherein
the detector faces an outer circumferential surface of the detectable member.

6. The blade open-close device according to claim 3, wherein
the detector faces, in the optical axis direction, a portion of the detectable member opposite to a portion of the detectable member facing the blade.

7. The blade open-close device according to claim 1, wherein
the optical member includes a plurality of lens units,
the opening portion includes a plurality of openings corresponding to the plurality of lens units, and
the blade covers or uncovers the plurality of openings.

8. An electronic device, comprising:
the blade open-close device according to claim 1.

* * * * *